(12) United States Patent
Ogasahara

(10) Patent No.: US 11,889,206 B2
(45) Date of Patent: Jan. 30, 2024

(54) SOLID-STATE IMAGING DEVICE AND ELECTRONIC EQUIPMENT

(71) Applicant: SONY SEMICONDUCTOR SOLUTIONS CORPORATION, Kanagawa (JP)

(72) Inventor: Takayuki Ogasahara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/798,212

(22) PCT Filed: Jan. 7, 2021

(86) PCT No.: PCT/JP2021/000380
§ 371 (c)(1),
(2) Date: Aug. 8, 2022

(87) PCT Pub. No.: WO2021/171797
PCT Pub. Date: Sep. 2, 2021

(65) Prior Publication Data
US 2023/0127881 A1    Apr. 27, 2023

(30) Foreign Application Priority Data
Feb. 26, 2020   (JP) .................................. 2020-030458

(51) Int. Cl.
*H04N 25/13* (2023.01)
*H04N 25/46* (2023.01)
(Continued)

(52) U.S. Cl.
CPC ............. *H04N 25/136* (2023.01); *H04N 9/73* (2013.01); *H04N 9/77* (2013.01); *H04N 25/46* (2023.01)

(58) Field of Classification Search
CPC ........ H04N 25/00; H04N 25/10; H04N 25/11; H04N 25/13; H04N 25/135; H04N 25/136
(Continued)

(56) References Cited

U.S. PATENT DOCUMENTS

2010/0104209 A1   4/2010  Deever et al.
2010/0165110 A1*  7/2010  Ohara ..................... H04N 23/80
                                                                348/E5.09
(Continued)

FOREIGN PATENT DOCUMENTS

JP    2009-017152    1/2009
JP    2009-157198    7/2009
(Continued)

OTHER PUBLICATIONS

International Search Report and Written Opinion prepared by the Japan Patent Office dated Mar. 15, 2021, for International Application No. PCT/JP2021/000380, 2 pgs.

*Primary Examiner* — Anthony J Daniels
(74) *Attorney, Agent, or Firm* — Sheridan Ross PC

(57) ABSTRACT

A solid-state imaging device capable of acquiring an RGB image, a CMY image, and luminance information through one imaging process. The solid-state imaging device includes a pixel array portion in which a plurality of pixel unit groups are arrayed, the pixel unit group including pixel units disposed in a 2×2 matrix, the pixel unit including pixels disposed in an 2×2 matrix, and the pixels including a photoelectric conversion unit and a color filter. Each of the pixel unit groups is configured such that an R filter and a C filter are included as the color filters in a first pixel unit among four pixel units constituting the pixel unit group, a G filter and an M filter are included as the color filters in each of second and third pixel units, and a B filter and a Y filter are included as the color filters in a fourth pixel unit.

5 Claims, 29 Drawing Sheets

(51) Int. Cl.
  *H04N 9/73* (2023.01)
  *H04N 9/77* (2006.01)
(58) Field of Classification Search
  USPC .......................................................... 348/272
  See application file for complete search history.

(56) References Cited

U.S. PATENT DOCUMENTS

| | | |
|---|---|---|
| 2011/0181763 A1 | 7/2011 | Hiramoto et al. |
| 2012/0147314 A1 | 6/2012 | Yoshizawa et al. |
| 2012/0188401 A1* | 7/2012 | Takemoto .............. H04N 23/88 |
| | | 348/E9.051 |
| 2013/0153748 A1* | 6/2013 | Suzuki ................ H04N 25/136 |
| | | 250/208.1 |
| 2015/0130977 A1* | 5/2015 | Ladd ..................... H04N 25/75 |
| | | 348/308 |
| 2020/0374493 A1* | 11/2020 | Jang ....................... H04N 23/88 |

FOREIGN PATENT DOCUMENTS

| | | | | |
|---|---|---|---|---|
| JP | 2013-013142 | | 1/2013 | |
| JP | 2016163306 A | * | 9/2016 | |
| JP | 2019-175912 | | 10/2019 | |
| WO | WO 2010/100896 | | 9/2010 | |
| WO | WO 2011/024705 | | 3/2011 | |
| WO | WO-2023016146 A1 | * | 2/2023 | .............. H04N 9/73 |

* cited by examiner

SOLID-STATE IMAGING DEVICE AND ELECTRONIC EQUIPMENT

CROSS REFERENCE TO RELATED APPLICATIONS

This application is a national stage application under 35 U.S.C. 371 and claims the benefit of PCT Application No. PCT/JP2021/000380, having an international filing date of 7 Jan. 2021, which designated the United States, which PCT application claimed the benefit of Japanese Patent Application No. 2020-030458, filed 26 Feb. 2020, the entire disclosures of each of which are incorporated herein by reference.

TECHNICAL FIELD

The present technology relates to a solid-state imaging device and electronic equipment.

BACKGROUND ART

In the related art, a solid-state imaging device having a configuration in which one pixel of a Bayer array is divided into a plurality of pixels has been proposed (see, for example, PTL 1). In the solid-state imaging device disclosed in PTL 1, it is possible to obtain a high-resolution captured image by performing full-resolution demosaic processing (a series of processing for performing demosaic processing after remosaic processing), it is possible to obtain a captured image having an excellent SN ratio by performing binning processing, and it is possible to obtain a captured image of a high dynamic range (HDR) by changing exposure conditions in each of a plurality of pixels.

CITATION LIST

Patent Literature

[PTL 1]
JP 2019-175912 A

SUMMARY

Technical Problem

However, in the solid-state imaging device disclosed in PTL 1, it is not possible to acquire all of an RGB image, a CMY image, and luminance information of a subject through one imaging process.

An object of the present disclosure is to provide a solid-state imaging device capable of acquiring an RGB image, a CMY image, and luminance information through one imaging process, and electronic equipment.

Solution to Problem

A solid-state imaging device of the present disclosure includes (a) a pixel array portion in which a plurality of pixel unit groups are arrayed, the pixel unit group being constituted by pixel units disposed in a 2×2 matrix, the pixel unit being constituted by pixels disposed in an m×m (m is a natural number of 2 or greater) matrix, and the pixel including a photoelectric conversion unit and a color filter formed to correspond to the photoelectric conversion unit, and (b) each of the pixel unit groups includes an R filter transmitting red light and a C filter transmitting cyan light having a complementary color relation with the red light as the color filters in a first pixel unit among four pixel units constituting the pixel unit group, includes a G filter transmitting green light and an M filter transmitting magenta light having a complementary color relation with the green light as the color filters in each of second and third pixel units, and includes a B filter transmitting blue light and a Y filter transmitting yellow light having a complementary color relation with the blue light as the color filters in a fourth pixel unit.

Electronic equipment of the present disclosure includes (a) a solid-state imaging device that includes a pixel array portion in which a plurality of pixel unit groups are arrayed, the pixel unit group being constituted by pixel units disposed in a 2×2 matrix, the pixel unit being constituted by pixels disposed in an m×m (m is a natural number of 2 or greater) matrix, and the pixel including a photoelectric conversion unit and a color filter formed to correspond to the photoelectric conversion unit, in which each of the pixel unit groups includes an R filter transmitting red light and a C filter transmitting cyan light having a complementary color relation with the red light as the color filters in a first pixel unit among four pixel units constituting the pixel unit group, includes a G filter transmitting green light and an M filter transmitting magenta light having a complementary color relation with the green light as the color filters in each of second and third pixel units, and includes a B filter transmitting blue light and a Y filter transmitting yellow light having a complementary color relation with the blue light as the color filters in a fourth pixel unit, (b) an optical lens that forms image light from a subject into an image on an imaging surface of the solid-state imaging device, and (c) a signal processing circuit that performs signal processing on a signal output from the solid-state imaging device.

DESCRIPTION OF EMBODIMENTS

Hereinafter, examples of a solid-state imaging device 1 and electronic equipment according to an embodiment of the present disclosure will be described with reference to FIGS. 1 to 28. The embodiments of the present disclosure will be described in the following order. Note that the present disclosure is not limited to the following examples. In addition, the effects described in this specification are exemplary and not limiting, and other effects may be provided.

1. First embodiment: electronic equipment
1-1 Overall configuration of electronic equipment
1-2 Configurations of main parts
1-3 Image generation processing
2. Second embodiment: electronic equipment
2-1 Configurations of main parts
2-2 Modification example
3. Example of application to moving body
4. Example of application to endoscopic operation system

1. First Embodiment: Electronic Equipment

1-1 Overall Configuration of Electronic Equipment

Figure 1:
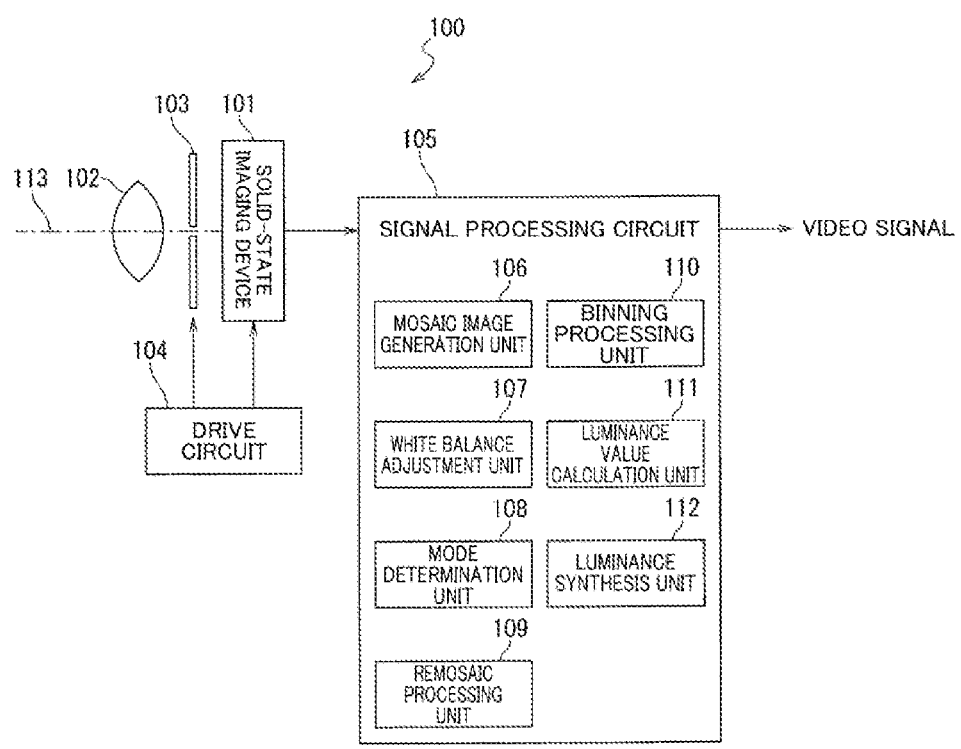
FIG. 1 is a diagram illustrating the overall configuration of electronic equipment according to a first embodiment of the present disclosure.

Electronic equipment 100 according to a first embodiment of the present disclosure will be described. As the electronic equipment 100, various electronic equipment such as imaging devices, for example, a digital still camera and a digital video camera, a mobile phone having an imaging function, or other equipment having an imaging function can be adopted. FIG. 1 is a schematic view illustrating the entire electronic equipment 100 according to the first embodiment of the present disclosure.

As illustrated in FIG. 1, the electronic equipment 100 includes a solid-state imaging device 101 (hereinafter, also referred to as a "solid-state imaging device 1"), an optical lens 102, a shutter device 103, a drive circuit 104, and a signal processing circuit 105. The signal processing circuit 105 includes a mosaic image generation unit 106, a white balance adjustment unit 107, a mode determination unit 108, a remosaic processing unit 109, a binning processing unit 110, a luminance value calculation unit 111, and a luminance synthesis unit 112. In the electronic equipment 100, the optical lens 102 forms an image of image light (incident light 113) received from a subject into an image on an imaging surface of the solid-state imaging device 101, the solid-state imaging device 101 converts the amount of incident light 113 into an electrical signal in pixel units and outputs a pixel signal, and the signal processing circuit 105 performs signal processing on the pixel signal which is output from the solid-state imaging device 101. At this time, the shutter device 103 controls a light irradiation period and a light shielding period for the solid-state imaging device 101. In addition, the drive circuit 104 supplies a driving signal for controlling a transfer operation of the pixel signal and a shutter operation of the shutter device 103.

Figure 2:
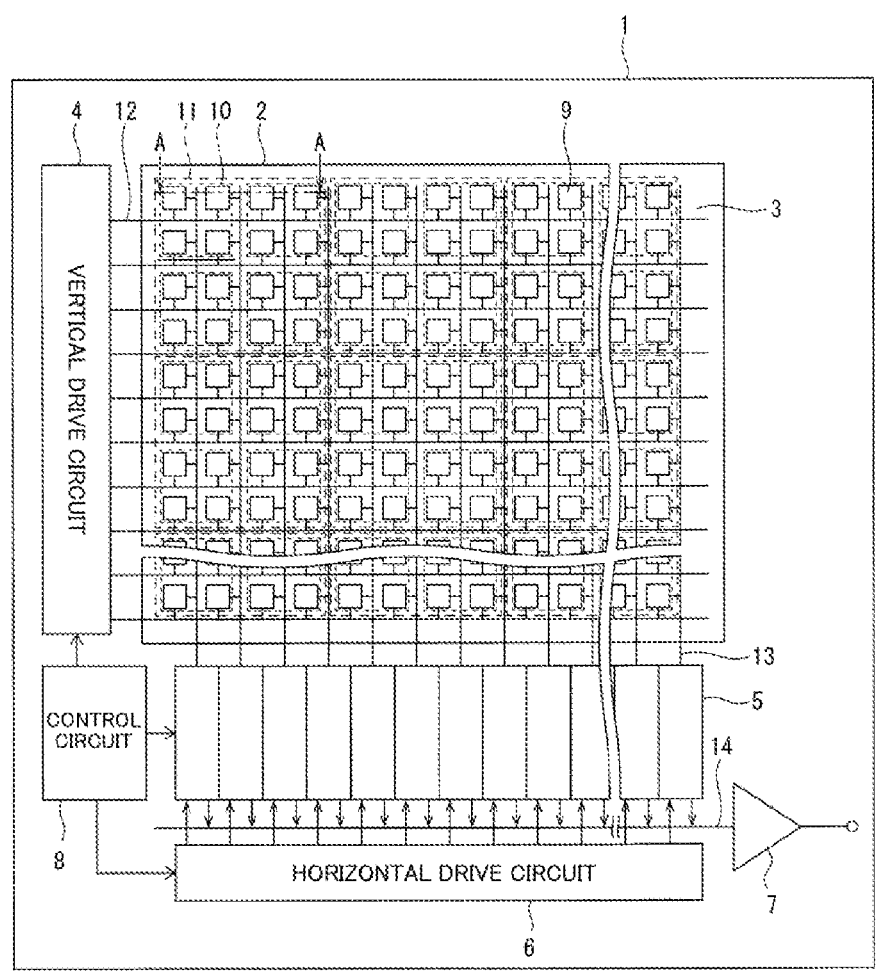
FIG. 2 is a diagram illustrating the overall configuration of a solid-state imaging device according to the first embodiment of the present disclosure.

FIG. 2 is a schematic configuration diagram illustrating the solid-state imaging device 1. The solid-state imaging device 1 in FIG. 2 is a backside irradiation type complementary metal oxide semiconductor (CMOS) image sensor.

Figure 3A:
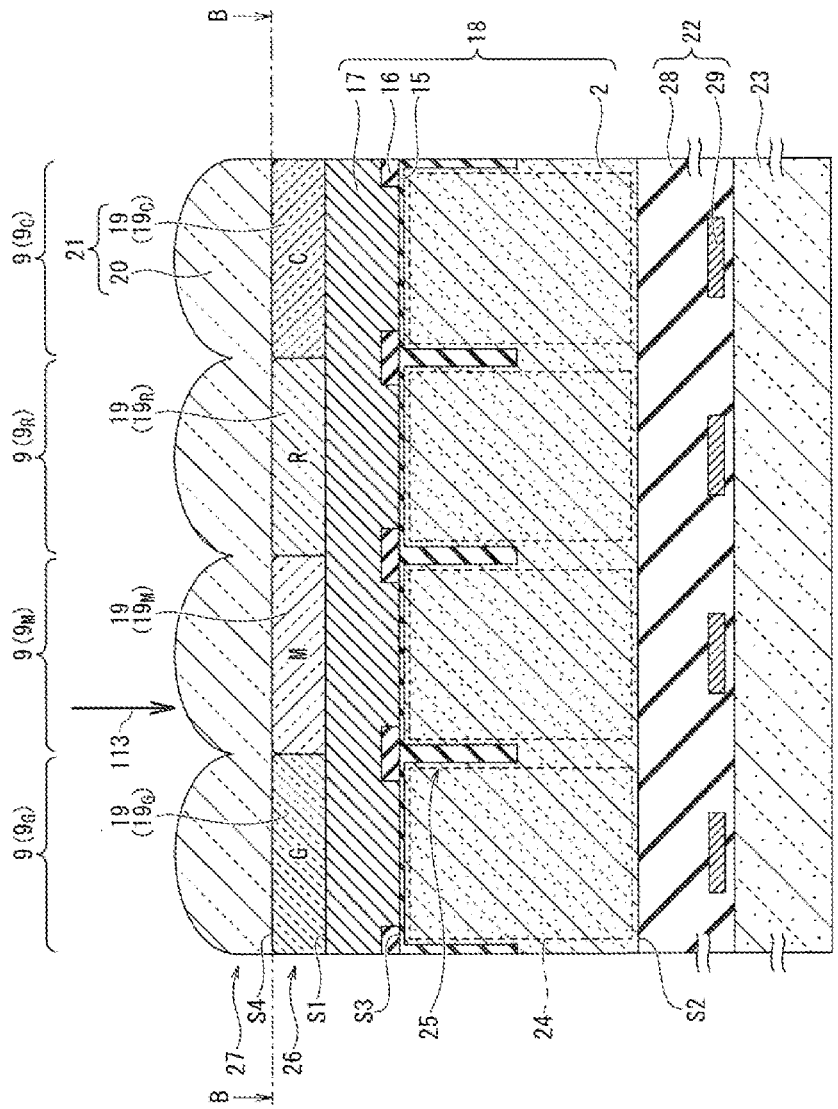
FIG. 3A is a diagram illustrating a cross-sectional configuration of a pixel array portion along a line A-A in FIG. 2.
Figure 3B:
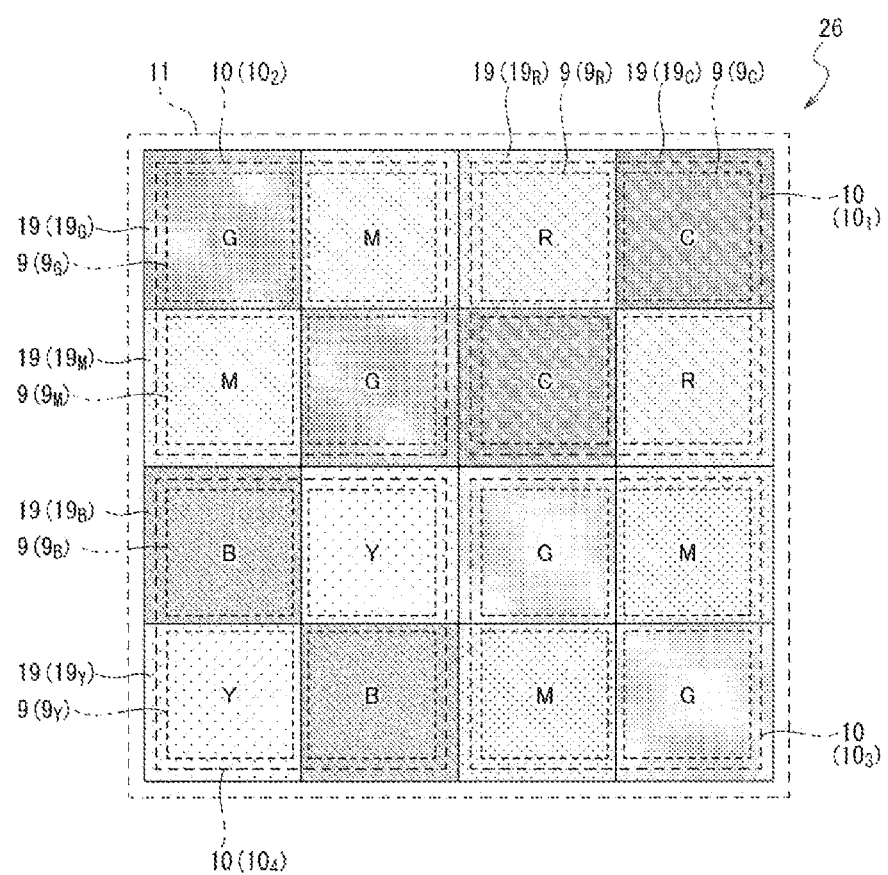
FIG. 3B is a diagram illustrating a minimum unit array of a color filter along a line B-B in FIG. 3A.

As illustrated in FIG. 2, the solid-state imaging device 1 includes a substrate 2, a pixel array portion 3, a vertical drive circuit 4, a column signal processing circuit 5, a horizontal drive circuit 6, an output circuit 7, and a control circuit 8. The pixel array portion 3 includes a plurality of pixels 9 that are arrayed in a matrix on the substrate 2. Each of the pixels 9 includes a photoelectric conversion unit 24, a color filter 19 formed to correspond to the photoelectric conversion unit 24, and a microlens 20 as illustrated in FIGS. 3A and 3B. Regarding the pixels 9, four pixels 9 arrayed in a 2×2 matrix constitute one pixel unit 10. In addition, regarding the pixel unit 10, four pixel units 10 arrayed in a 2×2 matrix constitute one pixel unit group 11. That is, the pixel array portion 3 is configured such that a plurality of pixel unit groups 11 are arrayed in a matrix.

Figure 4:
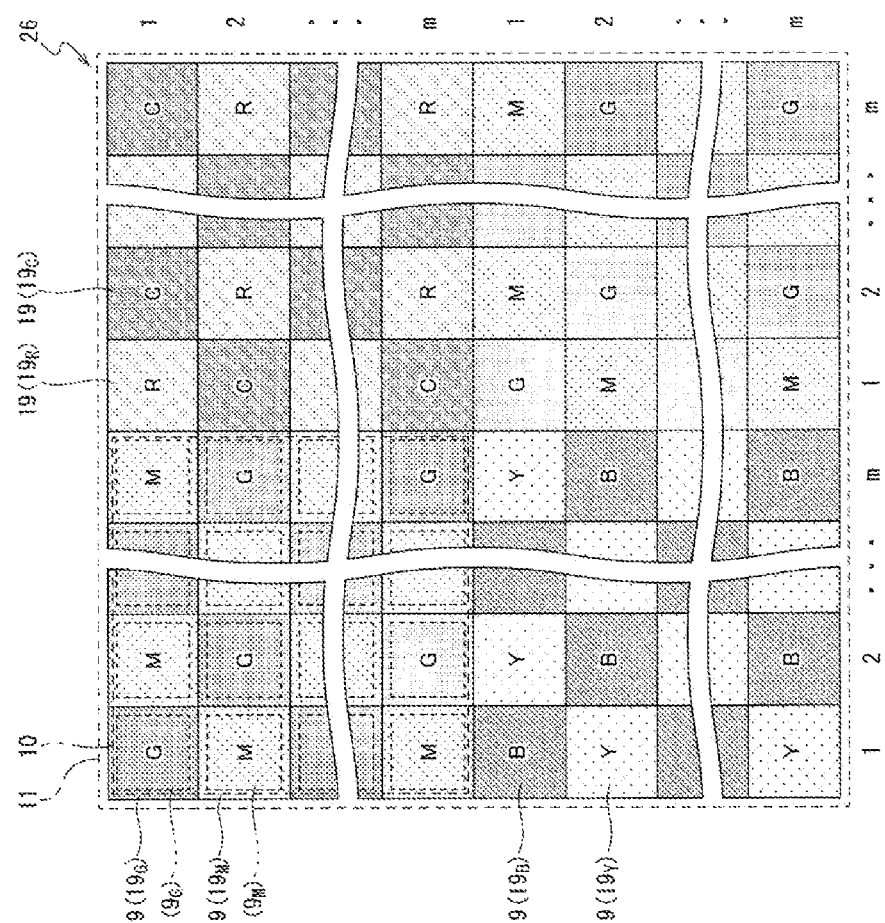
FIG. 4 is a diagram illustrating a minimum unit array of a color filter according to a modification example.

Note that, although an example in which one pixel unit 10 is constituted by the pixels 9 arrayed in a 2×2 matrix has been described in the first embodiment, other configurations can also be adopted. For example, as illustrated in FIG. 4, the pixel unit may be constituted by the pixels 9 arrayed in an m×m (m is a natural number of 2 or greater) matrix. In FIG. 4, a case where m is 5 or greater is illustrated.

The vertical drive circuit 4, which is constituted by, for example, a shift register, selects a desired pixel drive wiring 12, supplies a pulse for driving the pixels 9 to the selected pixel drive wiring 12, and drives the pixels 9 in units of rows. That is, the vertical drive circuit 4 sequentially performs selection scanning on the pixels 9 in the pixel array portion 3 in the vertical direction in units of rows, and supplies a pixel signal based on signal charge generated in accordance with the amount of light received in the photoelectric conversion unit 24 of each of the pixels 9 to the column signal processing circuits 5 through vertical signal lines 13.

The column signal processing circuit 5 is disposed, for example, for each column of the pixels 9, and performs signal processing such as noise removal for each pixel column on a signal which is output from the pixels 9 corresponding to one row. For example, the column signal processing circuit 5 performs signal processing such as correlated double sampling (CDS) and analog digital (AD) conversion for removing pixel-specific fixed pattern noise.

The horizontal drive circuit 6, which is constituted by, for example, a shift register, sequentially outputs a horizontal scanning pulse to the column signal processing circuits 5 to select each of the column signal processing circuits 5 in order, and outputs a pixel signal (hereinafter, also referred to as a "pixel value") having been subjected to signal processing to the horizontal signal line 14 from each of the column signal processing circuits 5.

The output circuit 7 performs signal processing on sequentially supplied pixel signals (pixel values) and outputs the pixel signals through the horizontal signal line 14 from each of the column signal processing circuits 5. Examples of the signal processing which may be adopted include buffering, black level adjustment, column variation correction, and various types of digital signal processing. The control circuit 8 generates a clock signal or a control signal as a reference for operations of the vertical drive circuit 4, the column signal processing circuit 5, the horizontal drive circuit 6, and the like on the basis of a vertical synchronization signal, a horizontal synchronization signal, and a master clock signal. In addition, the control circuit 8 outputs the generated clock signal or control signal to the vertical drive circuit 4, the column signal processing circuit 5, the horizontal drive circuit 6, and the like.

1-2 Configurations of Main Parts

Next, a detailed configuration of the solid-state imaging device 1 in FIG. 1 will be described. FIG. 3A is a diagram illustrating a cross-sectional configuration of the pixel array portion 3 of the solid-state imaging device 1. FIG. 3B is a diagram illustrating a minimum unit array of the color filter 19 along a line B-B in FIG. 3A. In FIGS. 3A and 3B, a backside irradiation type CMOS image sensor is used as the solid-state imaging device 1.

As illustrated in FIGS. 3A and 3B, the solid-state imaging device 1 according to the first embodiment includes a light receiving layer 18 in which the substrate 2, an insulating film 15, a light shielding film 16, and a flattening film 17 are laminated in that order. In addition, a light condensing layer 21 in which the color filter 19 and the microlens 20 (an on-chip lens) are laminated in that order is formed on a surface of the light receiving layer 18 on the insulating film 15 side (hereinafter, also referred to as a "rear surface S1"). Further, a wiring layer 22 and a support substrate 23 are laminated in this order on a surface of the light receiving layer 18 on the substrate 2 side (hereinafter, also referred to as a "surface S2"). Note that the rear surface S1 of the light receiving layer 18 and the rear surface of the flattening film 17 are the same surface, and thus the rear surface of the flattening film 17 will be referred to as a "rear surface S1" in the following description. In addition, the surface S2 of the light receiving layer 18 and the surface of the substrate 2 are the same surface, and thus the surface of the substrate 2 will be referred to as a "surface S2" in the following description.

The substrate 2 is constituted by a semiconductor substrate formed of, for example, silicon (Si), and forms the pixel array portion 3 illustrated in FIG. 1. In the pixel array portion 3, a plurality of photoelectric conversion units 24 formed on the substrate 2 are disposed in a matrix. In the photoelectric conversion unit 24, signal charge corresponding to the amount of incident light 113 is generated and accumulated. In addition, a pixel separation unit 25 is disposed between the photoelectric conversion units 24 that are adjacent to each other so that light having passed through other photoelectric conversion units 24 does not infiltrate. The insulating film 15 continuously covers the entire substrate 2 on the rear surface S1 side (the entirety on a light receiving surface side). In addition, the light shielding film 16 is formed in a lattice shape in a portion of the insulating film 15 on a rear surface S3 side (a portion on a light receiving surface side) so that a light receiving surface of each of the plurality of photoelectric conversion units 24 is open.

The color filter 19 is formed to correspond to each of the photoelectric conversion units 24 on the rear surface S1 side (light receiving surface side) of the insulating film 15. That is, one color filter 19 is formed for one photoelectric conversion unit 24 (pixel 9). Thereby, the color filters 19 form color filter arrays 26 that are regularly arranged in a matrix. Each of the color filters 19 is configured to transmit light having a specific wavelength of the incident light 113 (red light, green light, blue light, cyan light, magenta light, or yellow light) and make the transmitted light incident on the photoelectric conversion unit 24.

Figure 5:
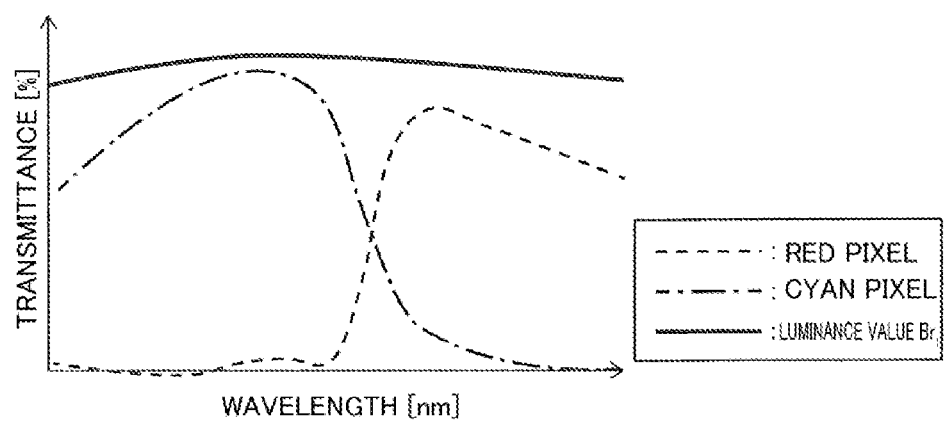
FIG. 5 is a diagram illustrating transmittances of a red pixel and a cyan pixel.
Figure 6:
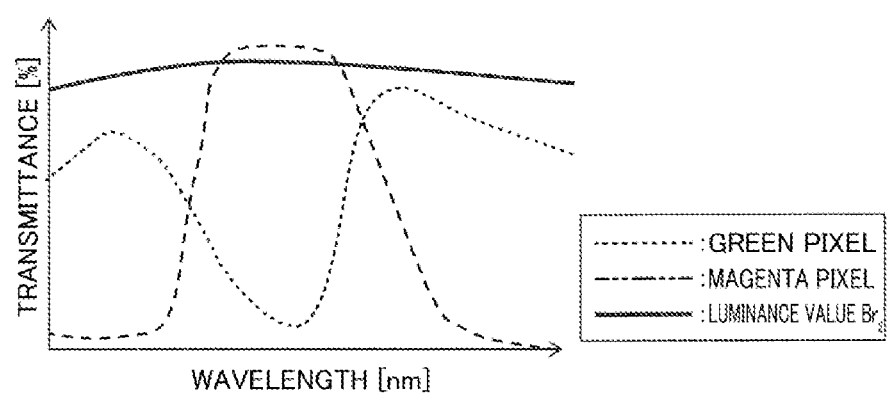
FIG. 6 is a diagram illustrating transmittances of a green pixel and a magenta pixel.
Figure 7:
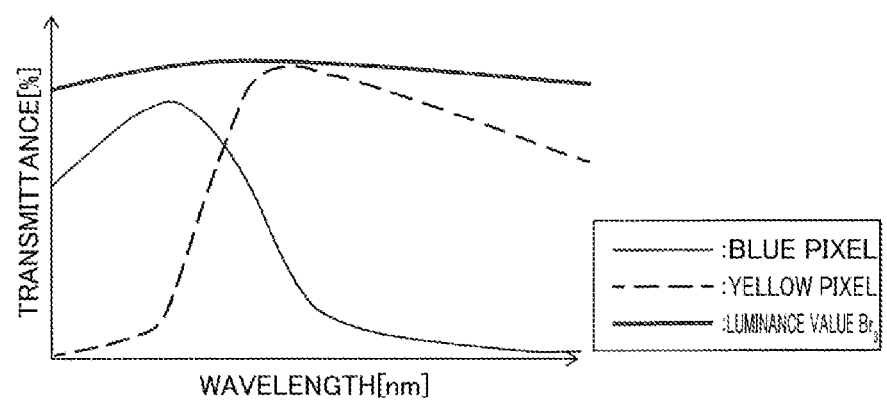
FIG. 7 is a diagram illustrating transmittances of a blue pixel and a yellow pixel.

As the color filters 19, an R filter $19_R$ that transmits red light, a G filter $19_G$ that transmits green light, a B filter $19_B$ that transmits blue light, a C filter $19_C$ that transmits cyan light having a complementary color relation with red light transmitted by the R filter $19_R$, an M filter $19_M$ that transmits magenta light having a complementary color relation with green light transmitted by the G filter $19_G$, and a Y filter $19_Y$ that transmits yellow light having a complementary color relation with blue light transmitted by the B filter $19_B$ are used. In other words, the C filter $19_C$ is a color filter having a transmittance decreasing at a wavelength at which the transmittance of the R filter $19_R$ increases and having a transmittance increasing at a wavelength at which the transmittance of the R filter $19_R$ decreases in a spectral distribution diagram as illustrated in FIG. 5. The M filter $19_M$ is a color filter having a transmittance decreasing at a wavelength at which the transmittance of the G filter $19_G$ increases and having a transmittance increasing at a wavelength at which the transmittance of the G filter $19_G$ decreases in a spectral distribution diagram as illustrated in FIG. 6. In addition, the Y filter $19_Y$ is a color filter having a transmittance decreasing at a wavelength at which the transmittance of the B filter $19_B$ increases and having a transmittance increasing at a wavelength at which the transmittance of the B filter $19_B$ decreases in a spectral distribution diagram as illustrated in FIG. 7.

In FIGS. 3A and 3B, a sign R indicates the R filter $19_R$, and similarly hereinafter, a sign G indicates the G filter $19_G$, a sign B indicates the B filter $19_B$, a sign C indicates the C filter $19_C$, a sign M indicates the M filter $19_M$, and a sign Y indicates the Y filter $19_Y$. Further, in the following description, a pixel 9 including the R filter $19_R$ will be represented as a red pixel $9_R$, a pixel 9 including the G filter $19_G$ will be represented as a green pixel $9_G$, a pixel 9 including the B filter $19_B$ will be represented as a blue pixel $9_B$, a pixel 9 including the C filter $19_C$ will be represented as a cyan pixel $9_C$, a pixel 9 including the M filter $19_M$ will be represented as a magenta pixel $9_M$, and a pixel 9 including the Y filter $19_Y$ will be represented as a yellow pixel $9_Y$.

Figure 8:
FIG. 8 is a diagram illustrating a configuration of a color filter array.

In addition, an array pattern of the color filters 19 (the R filter $19_R$, the G filter $19_G$, the B filter $19_B$, the C filter $19_C$, the M filter $19_M$, the Y filter $19_Y$) is configured such that an array of the color filters 19 disposed in a 4×4 matrix as illustrated in FIG. 3B is set as a minimum unit of an array of the color filters 19 (hereinafter, also referred to as a "minimum unit array"), and the minimum unit array is disposed in all of the pixel unit groups 11 of the pixel array portion 3 as illustrated in FIG. 8. The minimum unit array of the color filters 19 is an array in which a portion of a four-division Bayer array is corrected, the four-division Bayer array being configured such that the R filter $19_R$ is disposed in the pixel unit 10 on an upper right side (hereinafter, also referred to as a "first pixel unit $10_1$") among the four pixel units 10 constituting the pixel unit group 11, the G filter $19_G$ is disposed in the pixel unit 10 on an upper left side (hereinafter, also referred to as a "second pixel unit $10_2$") and the pixel unit 10 on a lower right side (hereinafter, also referred to as a "third pixel unit $10_3$"), and the B filter $19_B$ is disposed in the pixel unit 10 on a lower left side (hereinafter, also referred to as a "fourth pixel unit $10_4$") as illustrated in FIG. 3B. Specifically, the R filters $19_R$ in the pixels 9 on the upper right side and the lower left side among the pixels 9 in a 2×2 array constituting the first pixel unit $10_1$ of the four-division Bayer array are replaced with the C filters $19_C$. In addition, the G filters $19_G$ in the pixels 9 on the upper right side and the lower left side among the pixels 9 in a 2×2 array constituting each of the second pixel unit $10_2$ and the third pixel unit $10_3$ are replaced with the M filters $19_M$. In addition, the B filters $19_B$ in the pixels 9 on the upper right side and the lower left side among the pixels 9 in a 2×2 array constituting the fourth pixel unit $10_4$ are replaced with the Y filters $19_Y$.

That is, in the minimum unit array of the color filter 19, the R filters $19_R$ are included in one pixel pair out of pixel pairs (two pixels 9 constituting one set) which are disposed at diagonal positions in the first pixel unit 101, and the C filters $19_C$ are included in the other pixel pair. Similarly hereinafter, the G filters $19_G$ are included in one pixel pair out of pixel pairs disposed at diagonal positions in the second pixel unit $10_2$, and the M filters $19_M$ are included in the other pixel pair. In addition, the G filters $19_G$ are included in one pixel pair out of pixel pairs disposed at diagonal positions in the third pixel unit $10_3$, and the M filters $19_M$ are included in the other pixel pair. In addition, the B filters $19_B$ are included in one pixel pair out of pixel pairs disposed at diagonal positions in the fourth pixel unit $10_4$, and the Y filters $19_Y$ are included in the other pixel pair.

With this arrangement of the color filters 19 in the minimum unit array, in all of the color filters 19 included in the first pixel unit 101, the R filter $19_R$ and the C filter $19_C$ having a transmittance increasing at a wavelength at which the transmittance of the R filter $19_R$ decreases are combined with each other as illustrated in FIG. 5, and thus a transmittance is substantially flat for all light from a short wavelength side to a long wavelength side. Similarly hereinafter, in all of the color filters 19 included in the second pixel unit $10_2$, the G filter $19_G$ and the M filter $19_M$ having a transmittance increasing at a wavelength at which the transmittance of the G filter $19_G$ decreases are combined with each other as illustrated in FIG. 6, and thus a transmittance is substantially flat for all light from a short wavelength side to a long wavelength side. Further, in all of the color filters 19 included in the fourth pixel unit $10_4$, the B filter $19_B$ and the Y filter $19_Y$ having a transmittance increasing at a wavelength at which the transmittance of the B filter $19_B$ decreases are combined with each other as illustrated in FIG. 7, and thus a transmittance is substantially flat for all light from a short wavelength side to a long wavelength side.

Note that, as illustrated in FIG. 4, in a case where the pixel unit 10 is constituted by the pixels 9 disposed in an m×m matrix, and m is a natural number of 3 or greater (FIG. 4 illustrates a case where m is 5 or greater), the pixels 9 mutually disposed in a checkered pattern may be configured to include the R filter $19_R$, the G filter $19_G$, and the B filter $19_B$. Specifically, the first pixel unit 101 is configured such that some pixels 9 mutually positioned in a checkered pattern among the plurality of pixels 9 disposed in an m×m matrix include the R filter $19_R$, and the remaining pixels 9 include the C filter $19_C$. Similarly hereinafter, the second pixel unit $10_2$ is configured such that some pixels 9 mutually positioned in a checkered pattern among the plurality of pixels 9 disposed in an m×m matrix include the G filter $19_G$, and the remaining pixels 9 include the M filter $19_M$. In addition, the third pixel unit $10_3$ is configured such that some pixels 9 mutually positioned in a checkered pattern among the plurality of pixels 9 disposed in an m×m matrix include the G filter $19_G$, and the remaining pixels 9 include the M filter $19_M$. In addition, the fourth pixel unit $10_4$ is configured such that some pixels 9 mutually positioned in a checkered pattern among the plurality of pixels 9 disposed in an m×m matrix include the B filter $19_B$, and the remaining pixels 9 include the Y filter $19_Y$.

In this manner, the solid-state imaging device 1 according to the first embodiment is configured such that the color filters 19 also include the C filter $19_C$, the M filter $19_M$, and the Y filter $19_Y$, in addition to the R filter $19_R$, the G filter $19_G$, and the B filter $19_B$. For this reason, it is possible to generate an RGB image (an RGB mosaic image 38 in FIG. 14) by using pixel signals of the red pixel $9_R$ including the R filter $19_R$, the green pixel $9_G$ including the G filter $19_G$, and the blue pixel $9_B$ including the B filter $19_B$. In addition, it is possible to generate a CMY image (a CMY mosaic image 39 in FIG. 15) by using pixel signals of the cyan pixel $9_C$ including the C filter $19_C$, the magenta pixel $9_M$ including the M filter $19_M$, and the yellow pixel $9_Y$ including the Y filter $19_Y$. Further, it is possible to generate luminance information (a luminance image 41 in FIG. 16) by adding pixel values of the pixels 9 in the same pixel unit 10. For this reason, it is possible to acquire the RGB image, the CMY image, and the luminance information through one imaging process. The RGB image is susceptible to imaging in a dark place because the sensitivity of the color filter 19 is low, but color reproducibility is good because the overlap of spectral sensitivities of the color filters 19 is small. Although the CMY image has poor color reproducibility due to a large overlap of spectral sensitivities of the color filters 19, the sensitivity of the color filter 19 is low, and thus the CMY image is more susceptible to imaging in a dark place than the RGB image. In addition, it is possible to further improve color reproducibility by using six colors of a combination of the RGB image and the CMY image.

Figure 14:
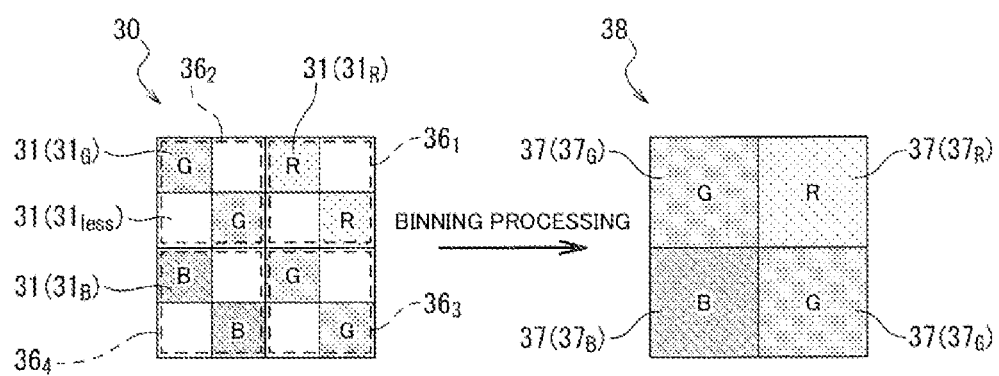
FIG. 14 is a diagram illustrating processing content of binning processing.
Figure 15:
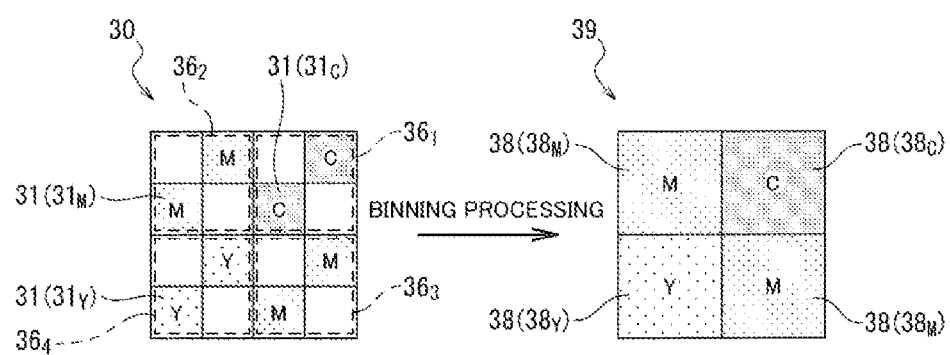
FIG. 15 is a diagram illustrating processing content of binning processing.

Further, in a case where the solid-state imaging device 1 according to the first embodiment is configured such that the R filters $19_R$ are included in one pixel pair out of the pixel pairs disposed at diagonal positions in the first pixel unit 101, and the C filters $19_C$ are included in the other pixel pair, the center of gravity of an image pixel $31_R$ having only color information of the color red in the mosaic image 30 corresponding to the array of the color filters 19 and the center of gravity of an image pixel $37_R$ generated by binning processing for the image pixel $31_R$ having only the color information of the color red become equal to each other as illustrated in FIG. 14, and thus it is not necessary to correct the center of gravity of the image pixel $31_R$ of the color red in the binning processing. In addition, as illustrated in FIGS. 14 and 15, this is also the same for an image pixel $31_G$ having only color information of the color green, an image pixel $31_R$ having only color information of the color blue, an image pixel $31_C$ having only color information of the color cyan, an image pixel $31_M$ having only color information of the color magenta, and an image pixel $31_Y$ having only color information of the color yellow. For this reason, it is possible to acquire a more appropriate RGB image and CMY image. In FIGS. 14 and 15, a sign R indicates the image pixel $31_R$ having only the color information of the color red (hereinafter, also referred to as a "red image pixel"), and similarly hereinafter, a sign G indicates the image pixel $31_G$ having only the color information of the color green (hereinafter, also referred to as a "green image pixel"), a sign B indicates the image pixel $31_B$ having only the color information of the color blue (hereinafter, also referred to as a "blue image pixel"), a sign C indicates the image pixel $31_C$ having only the color information of the color cyan (hereinafter, also referred to as a "cyan image pixel"), a sign M indicates the image pixel $31_M$ having only the color information of the color magenta (hereinafter, also referred to as a "magenta image pixel"), and a sign Y indicates the image pixel $31_Y$ having only the color information of the color yellow (hereinafter, also referred to as a "yellow image pixel").

Note that, although an example in which the pixel units 10 on the upper left side and the lower right side are set as the second pixel unit $10_2$ and the third pixel unit $10_3$ has been described in the first embodiment, other configurations can also be adopted. For example, it is also possible to adopt a configuration in which the second pixel unit $10_2$ and the third pixel unit $10_3$ are disposed in the pixel unit 10 on the upper right side and the pixel unit 10 on the lower left side, a configuration in which the second pixel unit $10_2$ and the third pixel unit $10_3$ are disposed in the pixel unit 10 on the upper left side and the lower left side, or a configuration in which the second pixel unit $10_2$ and the third pixel unit $10_3$ are disposed in the pixel unit 10 on the upper right side and the lower right side. In addition, for example, it is also possible to adopt a configuration in which the first pixel unit $10_1$ is disposed on the lower side, and the fourth pixel unit $10_4$ is disposed on the upper side. That is, each of the pixel unit groups 11 may be only required to be configured such that the R filter $19_R$ and the C filter $19_C$ are included as the color filters 19 in the first pixel unit $10_1$ among the four pixel units 10 constituting the pixel unit group 11, the G filter $19_G$ and the M filter $19_M$ are included as the color filters 19 in each of the second pixel unit $10_2$ and the third pixel unit $10_3$, and the B filter $19_B$ and the Y filter $19_Y$ are included as the color filters 19 in the fourth pixel unit $10_4$.

The microlens 20 is formed to correspond to each of the photoelectric conversion units 24 on the rear surface S4 side (light receiving surface side) of the color filter 19. That is, one microlens 20 is formed for one photoelectric conversion unit 24 (pixel 9). Thereby, the microlenses 20 form microlens arrays 27 that are regularly arranged in a matrix. Each of the microlenses 20 is configured to collect image light (incident light 113) from a subject and guide the collected incident light 113 to the vicinity of the rear surface (light receiving surface) of the photoelectric conversion unit 24 through the color filter 19.

Figure 9:
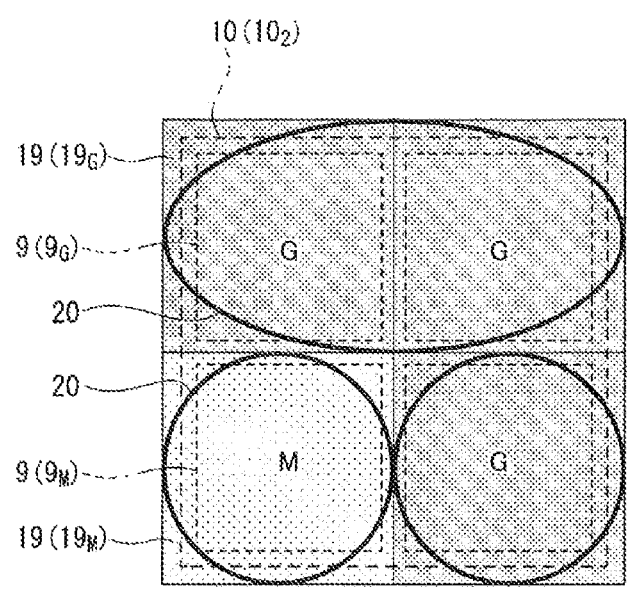
FIG. 9 is a diagram illustrating the disposition of a microlens according to a modification example.

Note that, although an example in which one microlens 20 is formed for one photoelectric conversion unit 24 has been described in the first embodiment, other configurations can also be adopted. For example, in a case where the green pixel $9_G$ is used as a phase difference pixel, a configuration may be adopted in which two green pixels $9_G$ arrayed in a 1×2 matrix are disposed as illustrated in FIG. 9, and one microlens 20 is formed for the disposed two green pixels $9_G$ (phase difference pixels). According to such a configuration, it is possible to detect a phase difference of a captured image between two green pixels $9_G$ (phase difference pixels) that share one microlens 20.

The wiring layer 22 is formed on the surface S2 side of the substrate 2, and is configured to include an interlayer insulating film 28 and wirings 29 laminated as a plurality of layers with the interlayer insulating film 28 interposed therebetween. The wiring layer 22 drives a pixel transistor constituting the pixel 9 through the plurality of layers of wirings 29.

The support substrate 23 is formed on a surface of the wiring layer 22 opposite to a side facing the substrate 2. The support substrate 23 is a substrate for securing the strength of the substrate 2 at a manufacturing stage of the solid-state imaging device 1. As a material of the support substrate 23, for example, silicon (Si) can be Used.

1-3 Image Generation Processing

Next, image generation processing executed by the signal processing circuit 105 (the mosaic image generation unit 106, the white balance adjustment unit 107, the mode determination unit 108, the remosaic processing unit 109, the binning processing unit 110, the luminance value calculation unit 111, the luminance synthesis unit 112) will be described.

Figure 10:
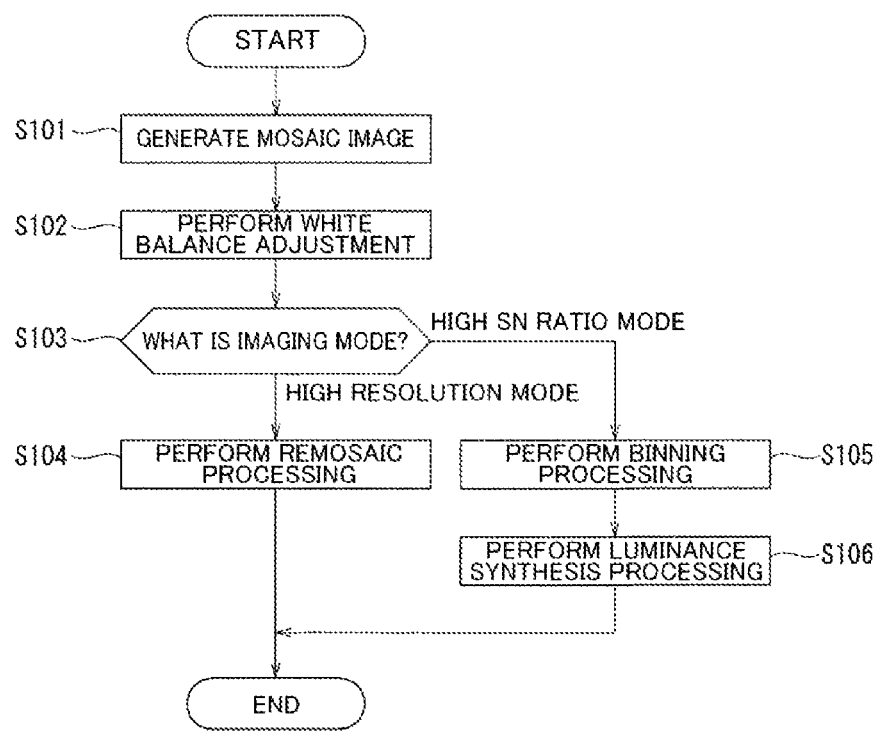
FIG. 10 is a flowchart illustrating image generation processing.
Figure 11:
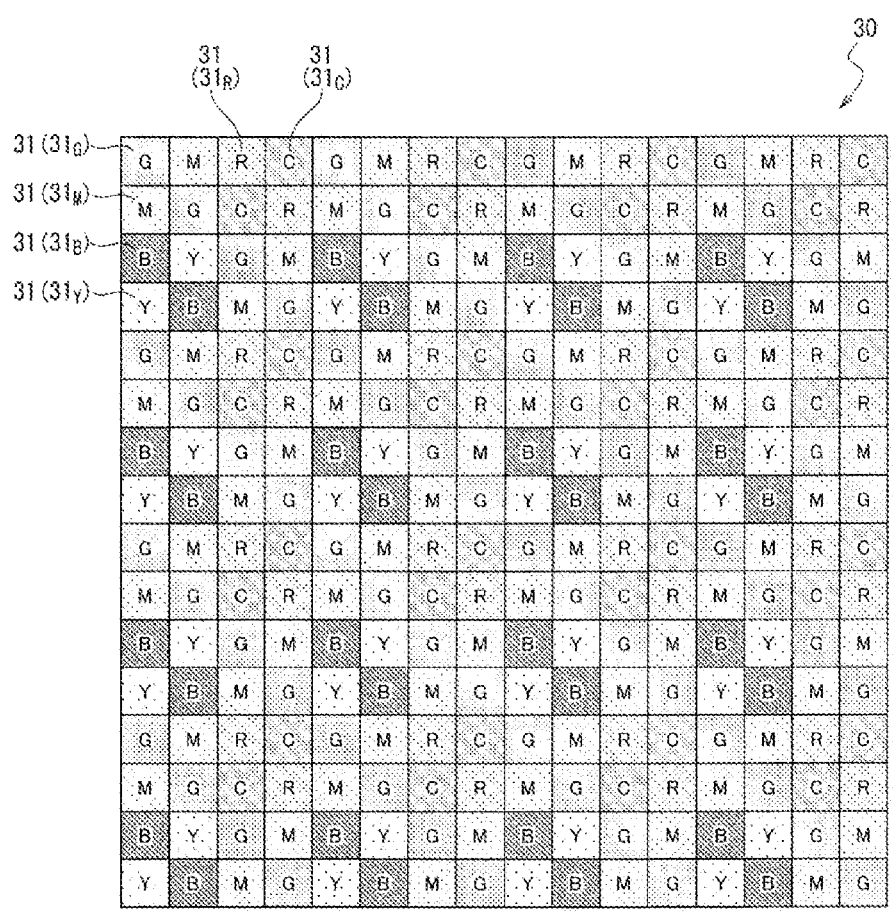
FIG. 11 is a diagram illustrating a captured image generated by a signal processing circuit.

When the image generation processing is executed, the mosaic image generation unit 106 first generates the mosaic image 30 corresponding to an array of the color filters 19 as illustrated in FIG. 11 based on pixel signals (pixel values) that are output from the red pixel $9_R$, the green pixel $9_G$, the blue pixel $9_B$, the cyan pixel $9_C$, the magenta pixel $9_M$, and the yellow pixel $9_Y$ in step S101 as illustrated in FIG. 10.

Subsequently, the processing proceeds to step S102, and the white balance adjustment unit 107 estimates color temperature of a light source based on the pixel values of the image pixels 31 of the mosaic image 30 which are generated in step S101, and adjusts the white balance of the mosaic image 30 based on the estimated color temperature.

Subsequently, the processing proceeds to step S103, and the mode determination unit 108 determines which one of a high resolution mode and a high SN ratio mode an imaging mode selected by a user of the electronic equipment 100 is. In addition, in a case where a determination result is a high resolution mode, the processing proceeds to step S104. On the other hand, in a case where a determination result is a high SN ratio mode, the processing proceeds to step S105.

Figure 12:
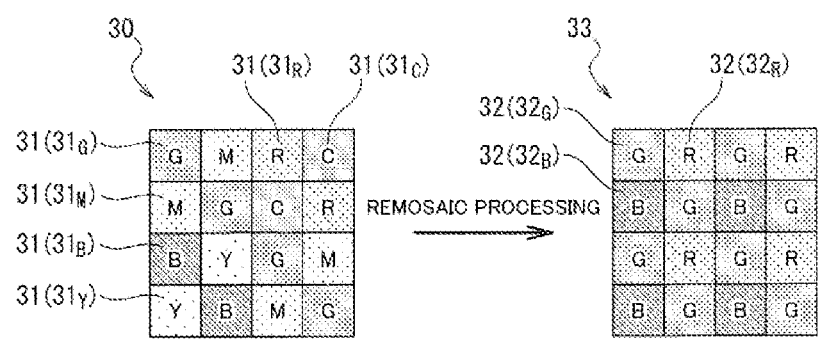
FIG. 12 is a diagram illustrating processing content of remosaic processing.
Figure 13:
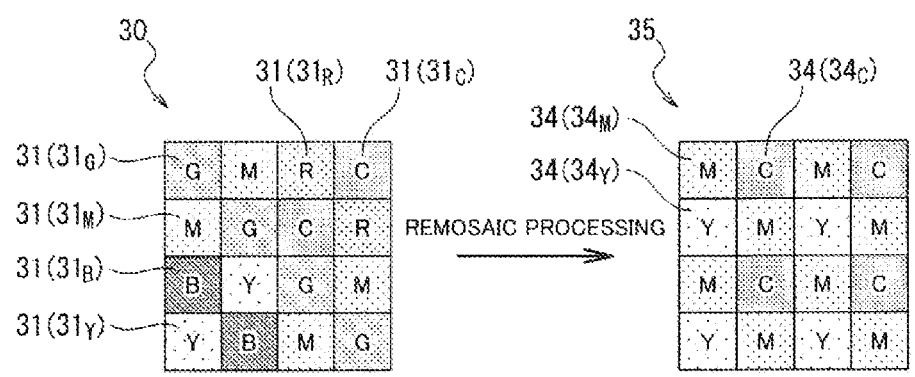
FIG. 13 is a diagram illustrating processing content of remosaic processing.

In step S104, the remosaic processing unit 109 performs remosaic processing on the mosaic image 30 for which white balance has been corrected in step S102. In the remosaic processing, a pixel array of the red, green, and blue image pixels $31_R$, $31_G$, and $31_B$ constituting the mosaic image 30 is converted into a Bayer array as illustrated in FIG. 12, thereby generating an RGB mosaic image 33 constituted by red, green, and blue image pixels $32_R$, $32_G$, and 32B of the Bayer array. In addition, as illustrated in FIG. 13, a pixel array of the cyan, magenta, and yellow image pixels $31_C$, $31_M$, and $31_Y$ is converted into a predetermined array determined in advance, thereby generating a CMY mosaic image 35 constituted by cyan, magenta, and yellow image pixels $34_C$, $34_M$, and $34_Y$ of the predetermined array. FIG. 13 illustrates a case where a pixel array formed by replacing the red, green, and blue image pixels $32_R$, $32_G$, and 32B of the Bayer array with the cyan, magenta, and yellow image pixels $34_C$, $34_M$, and $34_Y$ is used as a predetermined array. FIG. 12 illustrates enlarged parts of the mosaic image 30 and the RGB mosaic image 33.

In addition, FIG. 13 illustrates enlarged parts of the mosaic image 30 and the CMY mosaic image 35.

On the other hand, in step S105, the binning processing unit 110 performs binning processing on the mosaic image 30 for which white balance has been corrected in step S102, and then the processing proceeds to step S106. In the binning processing, as illustrated in FIG. 14, the pixel values of the red image pixels $31_R$ are added in each of pixel groups $36_1$ corresponding to the first pixel unit $10_1$ in the mosaic image 30 to form a pixel value of one red image pixel $37_R$. Similarly hereinafter, pixel values of the green image pixels $31_G$ are added in each of pixel groups $36_2$ corresponding to the second pixel unit $10_2$ to form a pixel value of one green image pixel $37_G$. In addition, pixel values of the green image pixels $31_G$ are added in each of pixel groups $36_3$ corresponding to the third pixel unit $10_3$ to form a pixel value of one green image pixel $37_G$. In addition, pixel values of the blue image pixels $31_B$ are added in each of pixel groups $36_4$ corresponding to the fourth pixel unit $10_4$ to form a pixel value of one blue image pixel 37B. Thereby, an RGB mosaic image 38 constituted by the red image pixel $37_R$ (image pixel $37_R$ having only color information of the color red), the green image pixel $37_G$ (the image pixel $37_G$ having only color information of the color green), and the blue image pixel $37_G$ (the image pixel 37B having only color information of the color blue) is generated. The number of pixels of the RGB mosaic image 38 is a quarter of the number of pixels of the mosaic image 30. FIG. 14 illustrates enlarged parts of the mosaic image 30 and the RGB mosaic image 38.

Further, in the binning processing, as illustrated in FIG. 15, the pixel values of the cyan image pixels $31_C$ are added in each of the pixel groups $36_1$ corresponding to the first pixel unit $10_1$ in the mosaic image 30 for which white balance has been corrected in step S102 to form a pixel value of one cyan image pixel $38_C$. Similarly hereinafter, pixel values of the magenta image pixels $31_M$ are added in each of the pixel groups $36_2$ corresponding to the second pixel unit $10_2$ to form a pixel value of one magenta image pixel $38_M$. In addition, pixel values of the magenta image pixels $31_M$ are added in each of pixel groups $36_3$ corresponding to the third pixel unit $10_3$ to form a pixel value of one magenta image pixel $38_M$. In addition, pixel values of the yellow image pixels $31_Y$ are added in each of the pixel groups $36_4$ corresponding to the fourth pixel unit $10_4$ to form a pixel value of one yellow image pixel $38_Y$. Thereby, a CMY mosaic image 39 constituted by the cyan image pixel $38_C$ (the image pixel $38_C$ having only color information of the color cyan), the magenta image pixel $38_M$ (the image pixel $38_M$ having only color information of the color magenta), and the yellow image pixel $38_Y$ (the image pixel $38_Y$ having only color information of the color yellow) is generated. The number of pixels of the CMY mosaic image 39 is a quarter of the number of pixels of the mosaic image 30. FIG. 15 illustrates enlarged parts of the mosaic image 30 and the CMY mosaic image 39.

Figure 16:
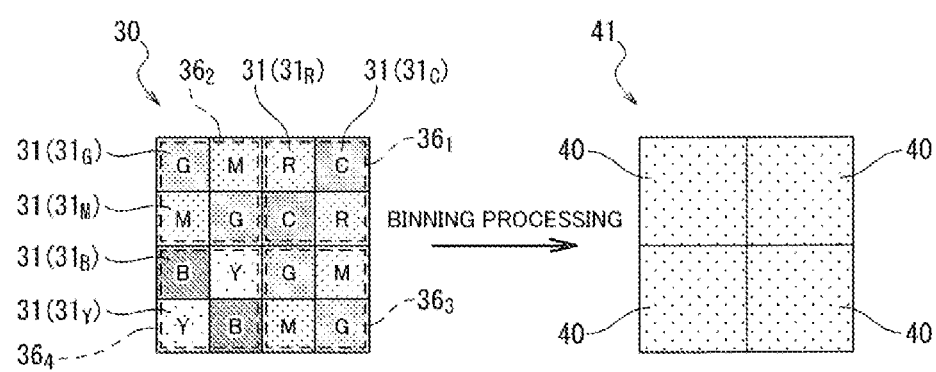
FIG. 16 is a diagram illustrating processing content of binning processing.

Further, in the binning processing, the luminance value calculation unit 111 adds the pixel values of the image pixels $31_R$ and $31_C$ having color information of red and cyan colors in each of the pixel groups $36_1$ corresponding to the first pixel unit $10_1$ in the mosaic image 30 for which white balance has been corrected in step S102 to calculate a luminance value of one image pixel 40 as illustrated in FIG. 16. Similarly hereinafter, the pixel values of the image pixels $31_G$ and $31_M$ having color information of green and magenta colors in each of the pixel groups $36_2$ corresponding to the second pixel unit $10_2$ to calculate a luminance value of one image pixel 40. In addition, the pixel values of the image pixels $31_G$ and $31_M$ having color information of green and magenta colors are added in each of the pixel groups $36_3$ corresponding to the third pixel unit $10_3$ to calculate a luminance value of one image pixel 40. In addition, the pixel values of the image pixels $31_B$ and $31_M$ having color information of blue and yellow colors are added in each of the pixel groups $36_4$ corresponding to the fourth pixel unit $10_4$ to calculate a luminance value of one image pixel 40. Thereby, the luminance image 41 representing only luminance values of the image pixels 40 is generated. The number of pixels of the luminance image 41 is a quarter of the number of pixels of the mosaic image 30. FIG. 16 illustrates enlarged parts of the mosaic image 30 and the luminance image 41.

Note that a configuration may be adopted in which a numerical value obtained by multiplying a pixel value of the mosaic image 30 by a correction coefficient is used as a pixel value used to calculate a luminance value, the mosaic image being an image for which white balance has been corrected in step S102. Specifically, luminance values $Br_1$, $Br_2$, and $Br_3$ of the image pixels 40 of the luminance image 41 are calculated in accordance with the following Formula (1) based on pixel values R, G, B, Cy, Mg, and Ye of the image pixels 31 of the mosaic image 30 and correction coefficients $a_{11}$, $a_{21}$, $a_{12}$, $a_{22}$, $a_{13}$, and $a_{23}$ determined in advance.

[Math. 1]

$$\begin{pmatrix} R & Cy \\ G & Mg \\ B & Ye \end{pmatrix} \begin{pmatrix} a_{11} & a_{12} & a_{13} \\ a_{21} & a_{22} & a_{23} \end{pmatrix} = (Br_1 \ Br_2 \ Br_3) \quad (1)$$

In the above-described Formula (1), R is a pixel value of the red image pixel $31_R$, G is a pixel value of the green image pixel $31_G$, B is a pixel value of the blue image pixel $31_B$, Cy is a pixel value of the cyan image pixel $31_C$, Mg is a pixel value of the magenta image pixel $31_M$, and Ye is a pixel value of the yellow image pixel $31_Y$. In addition, $Br_1$ is a luminance value obtained from the pixel values R and Cy of the red and cyan image pixels $31_R$ and $31_C$, $Br_2$ is a luminance value obtained from the pixel values G and Mg of the green and magenta image pixels $31_G$ and $31_M$, and $Br_3$ is a luminance value obtained from the pixel values B and Ye of the blue and yellow image pixels $31_B$ and $31_Y$. As the correction coefficients all, $a_{21}$, $a_{12}$, $a_{22}$, $a_{13}$, and $a_{23}$, a numerical value for which a numerical value different for each color temperature of a light source is set is used so that a relation of $Br_1 = Br_2 = Br_3$ is established. Thereby, as illustrated in FIGS. 5, 6, and 7, it is possible to reduce a difference between the luminance values $Br_1$, $Br_2$, and $Br_3$.

Figure 17:
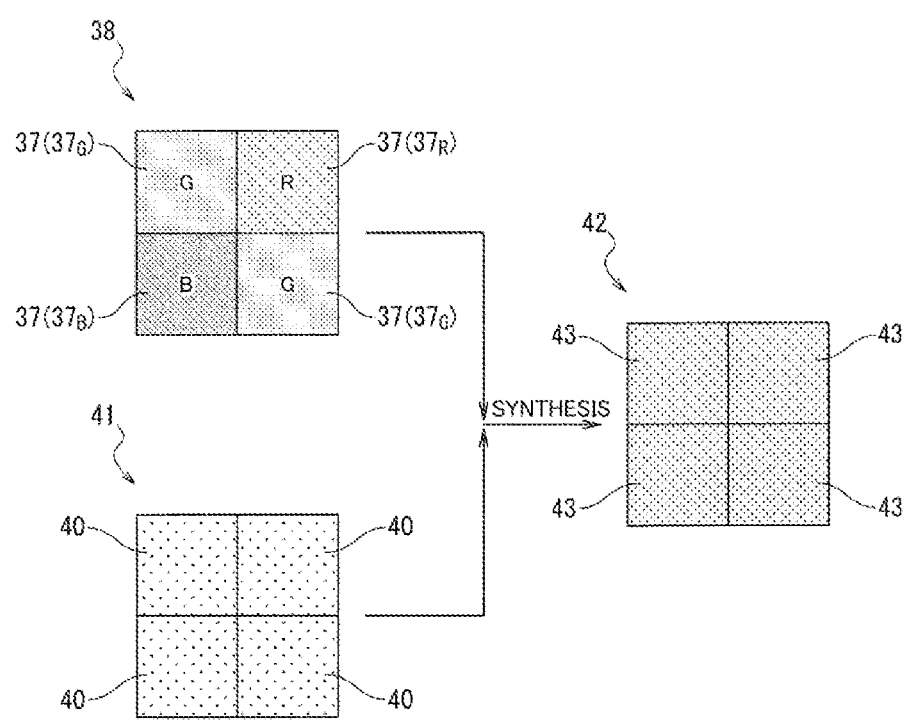
FIG. 17 is a diagram illustrating processing content of luminance synthesis processing.

Subsequently, the processing proceeds to step S106, the luminance synthesis unit 112 performs luminance synthesis processing on the RGB mosaic image 38 generated in step S105 or the CMY mosaic image 39. In the luminance synthesis processing, first, it is determined whether a subject is bright based on the pixel values of the image pixels 31 of the mosaic image 30 generated in step S101. Further, in a case where it is determined that the subject is bright, the luminance value of the luminance image 41 is synthesized with the RGB mosaic image 38 to generate a synthesis image 42 as illustrated in FIG. 17. It is possible to achieve both a high color reproducibility and a high resolution by synthesizing the RGB mosaic image 38 and the luminance image 41. In addition, parallax correction is not necessary unlike, for example, a compound-eye camera separately including a solid-state imaging device for obtaining the RGB mosaic image 38 and a solid-state imaging device for obtaining the luminance image 41.

In the synthesis of the RGB mosaic image 38 and the luminance image 41, first, a $Y_1$ signal, a Cb signal, and a Cr signal of pixels are calculated in accordance with the following Formula (2) based on the pixel values R, G, and B of the pixels 37 of the RGB mosaic image 38 and the coefficients $b_{11}$, $b_{21}$, $b_{31}$, $b_{12}$, $b_{22}$, $b_{32}$, $a_{13}$, $a_{23}$, and $a_{33}$ determined in advance. Subsequently, luminance signals Y of the pixels 43 of the synthesis image 42 are calculated in accordance with the following Formula (3) based on the calculated $Y_1$ signal and luminance values ($Y_2$ signals) of the image pixels 40 of the luminance image 41. That is, the $Y_1$ signal is corrected using the $Y_2$ signal to be set as a luminance signal Y. In this case, the Cb signal and the Cr signal calculated in the above-described Formula (2) are used as color information of the pixels 43.

[Math. 2]

$$\begin{pmatrix} Y_1 \\ Cb \\ Cr \end{pmatrix} = \begin{pmatrix} b_{11} & b_{12} & b_{13} \\ b_{21} & b_{22} & b_{23} \end{pmatrix} \begin{pmatrix} R \\ G \\ B \end{pmatrix} \quad (2)$$

$$Y = aY_1 + (1-a)Y_2 \quad (3)$$

Here, the signal value YiCbCr is obtained by complement processing from an adjacent pixel, and thus there is a tendency for a resolution (equivalent to the $Y_1$ signal) to deteriorate. On the other hand, the resolution of the $Y_2$ signal hardly deteriorates. For this reason, according to the above-described Formula (3), it is possible to obtain a high-resolution image.

Figure 18:
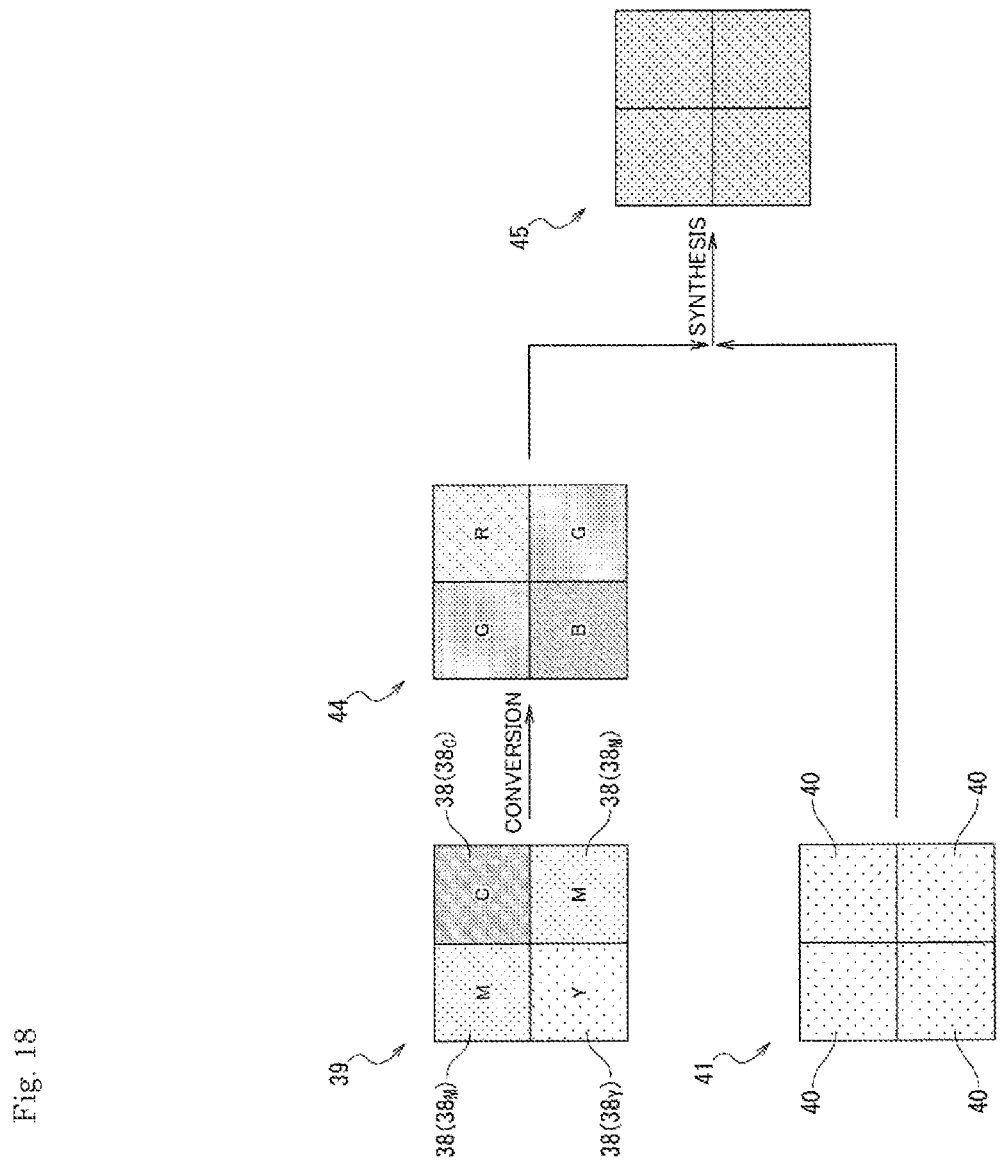
FIG. 18 is a diagram illustrating processing content of luminance synthesis processing.

On the other hand, in a case where it is determined that the subject is dark, the CMY mosaic image 39 is converted into an RGB mosaic image 44 using a color conversion matrix as illustrated in FIG. 18. Subsequently, the luminance image 41 is synthesized with the converted RGB mosaic image 44 to generate a synthesis image 45. It is possible to achieve both a high SN ratio and a high resolution by synthesizing the luminance image 41 with the RGB mosaic image 44. In addition, parallax correction is not necessary unlike, for example, the above-described compound-eye camera.

As described above, in the solid-state imaging device 1 according to the first embodiment of the present disclosure, each of the pixel unit groups 11 is configured such that the R filter 19$_R$ and the C filter 19$_C$ are included as the color filters 19 in the first pixel unit 10$_1$ among the four pixel units 10 constituting the pixel unit group 11, the G filter 19$_G$ and the M filter 19$_M$ are included as the color filters 19 in each of the second pixel unit 10$_2$ and the third pixel unit 10$_3$, and the B filter 19$_B$ and the Y filter 19$_Y$ are included as the color filters 19 in the fourth pixel unit 10$_4$. For this reason, an RGB image can be generated by using the pixel signals of the red pixel 9$_R$, the green pixel 9$_G$, and the blue pixel 9$_B$. In addition, a CMY image can be generated by using the pixel signals of the cyan pixel 9$_C$, the magenta pixel 9$_M$, and the yellow pixel 9$_Y$. Further, luminance information can be generated by adding pixel values of the pixels 9 in the same pixel unit 10. For this reason, it is possible to provide the solid-state imaging device 1 capable of acquiring an RGB image, a CMY image, and luminance information through one imaging process.

2. Second Embodiment: Electronic Equipment

2-1 Configurations of Main Parts

Figure 19:
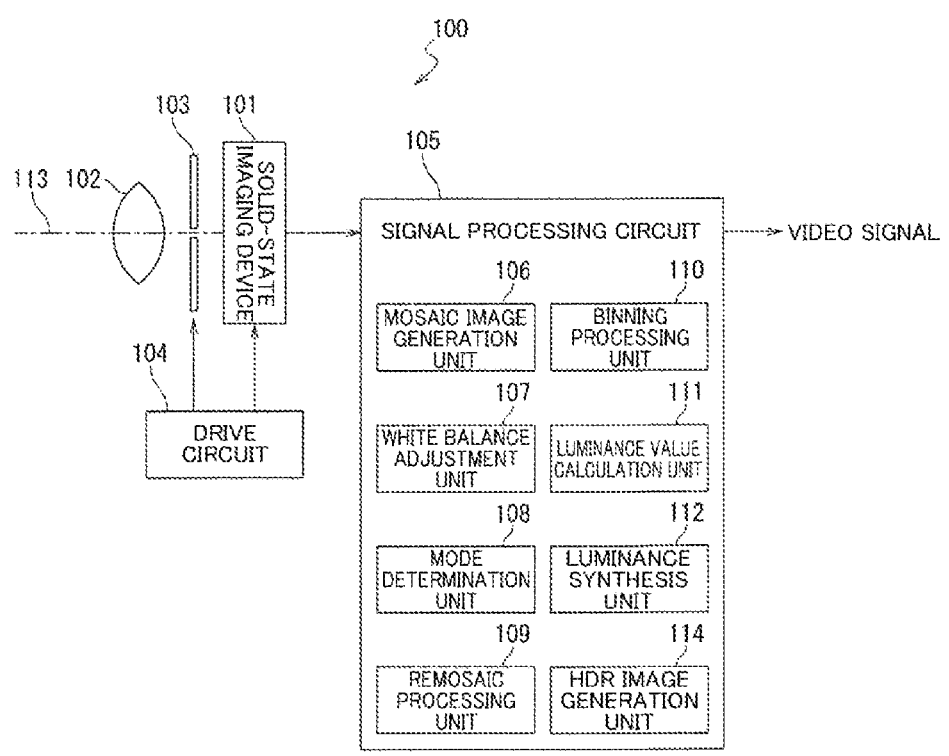
FIG. 19 is a diagram illustrating the overall configuration of electronic equipment according to a second embodiment of the present disclosure.
Figure 20:
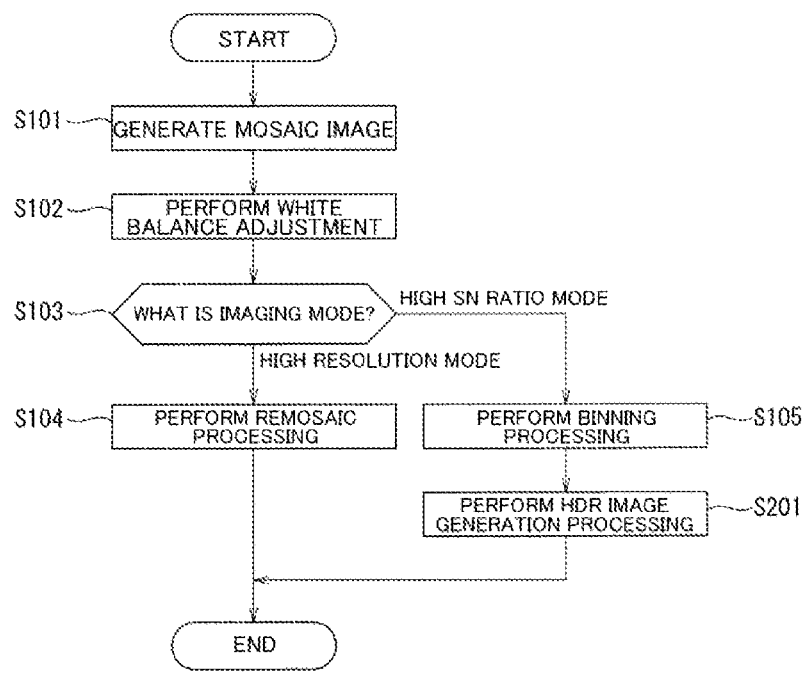
FIG. 20 is a flowchart illustrating image generation processing.

Next, electronic equipment 100 according to a second embodiment of the present disclosure will be described. FIG. 19 is a diagram illustrating the overall configuration of the electronic equipment 100 according to the second embodiment. In addition, FIG. 20 is a flowchart illustrating image generation processing of the first embodiment. In FIGS. 19 and 20, parts corresponding to those in FIGS. 1 and 10 are given the same reference numerals and signs, and repeated descriptions thereof will not be given.

The electronic equipment 100 according to the second embodiment is different from that in the first embodiment in that the signal processing circuit 105 includes an HDR image generation unit 114 as illustrated in FIG. 19, and image generation processing includes step S201 instead of step S106 in FIG. 10 as illustrated in FIG. 20.

Figure 21:
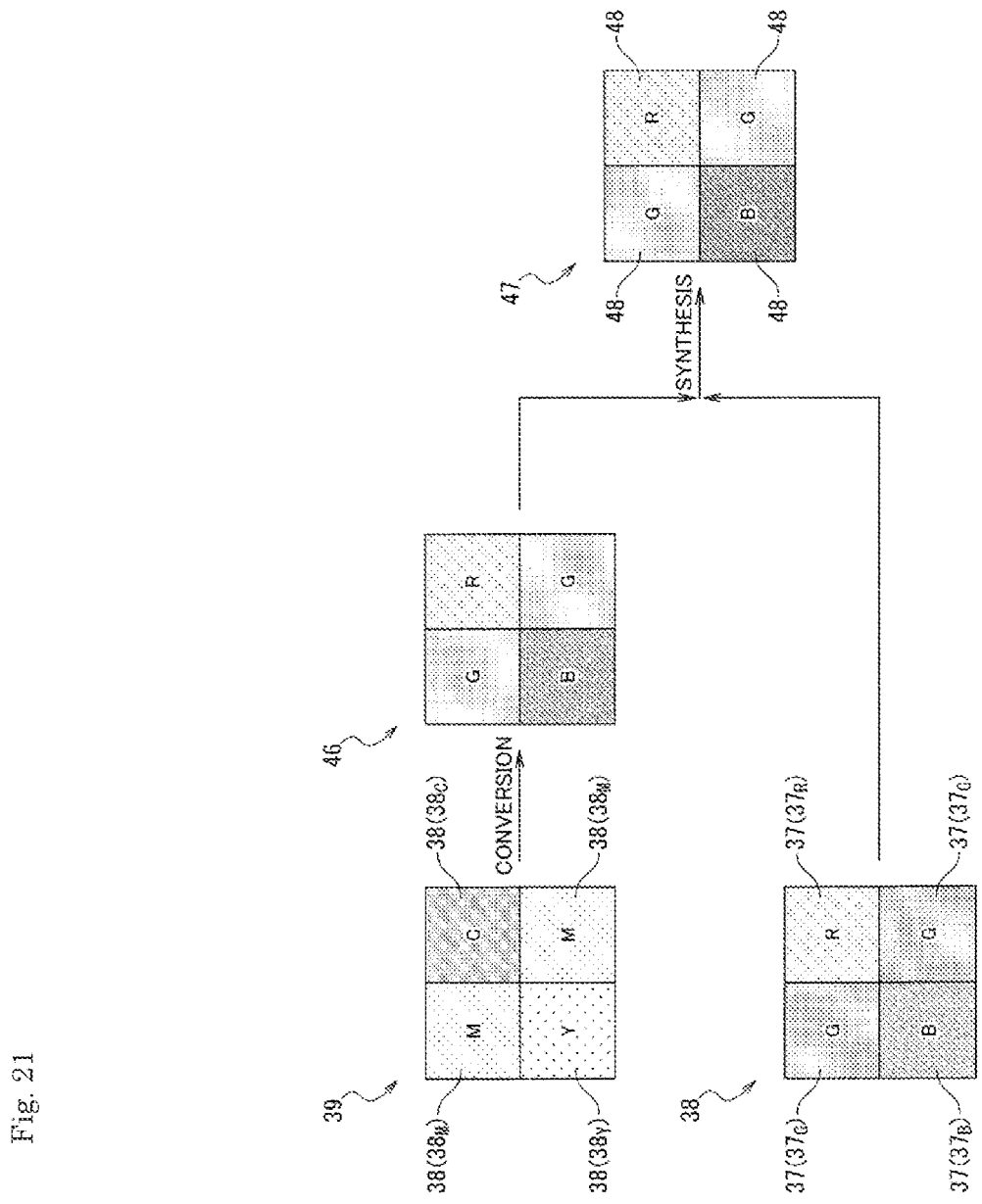
FIG. 21 is a diagram illustrating processing content of HDR image generation processing.
Figure 22:
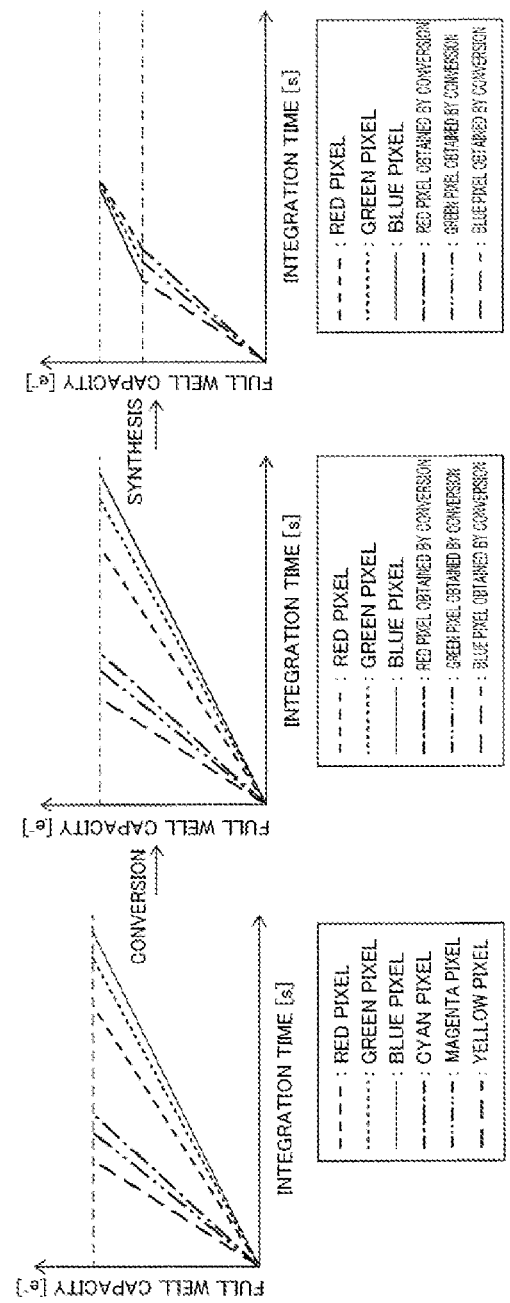
FIG. 22 is a diagram illustrating processing content of HDR image generation processing.

In step S201, the HDR image generation unit 114 performs HDR image generation processing based on the RGB mosaic image 38 generated in step S105 and the CMY mosaic image 39 (see FIGS. 14 and 15). In the HDR image generation processing, the CMY mosaic image 39 is converted into an RGB mosaic image 46 using a color conversion matrix as illustrated in FIGS. 21 and 22. Subsequently, the converted RGB mosaic image 46 and the RGB mosaic image 38 generated in step S105 are synthesized to generate an HDR image 47. As a method of synthesizing the RGB mosaic image 46 obtained from the CMY mosaic image 39 and the RGB mosaic image 38 generated in step S105, for example, a method of adding the pixel value of the RGB mosaic image 46 and the pixel value of the RGB mosaic image 38 for each image pixel 48 can be adopted.

As described above, the electronic equipment 100 according to the second embodiment of the present disclosure is configured to convert the CMY mosaic image 39 into the RGB mosaic image 46 and synthesize the converted RGB mosaic image 46 and the RGB mosaic image 38 generated by the binning processing unit 110 to generate the HDR image 47 (high dynamic range image). For this reason, it is possible to generate the HDR image 47 in addition to an RGB image, a CMY image, and luminance information through one imaging process.

2-2 Modification Example

Figure 23:
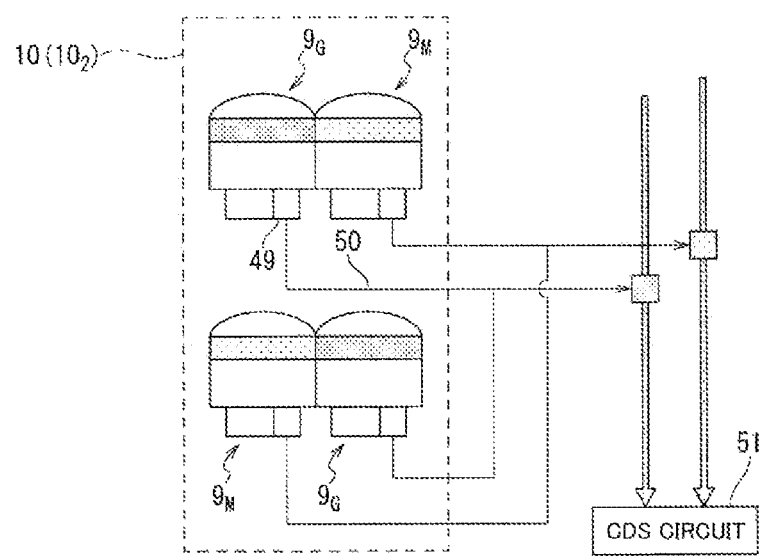
FIG. 23 is a diagram illustrating a connection state of a signal line.

Note that, in the electronic equipment 100 according to the first and second embodiments of the present disclosure, an example in which binning processing is digitally performed by the signal processing circuit 105 provided outside the solid-state imaging device 1 has been described, but other configurations can also be adopted. For example, a configuration may be adopted in which binning processing is performed in an analog manner at the time of reading a pixel signal from the pixel 9 of the solid-state imaging device 1. Specifically, as illustrated in FIG. 23, it is possible to adopt a configuration in which signal lines 50 connected to floating diffusions 49 of the pixels 9 of the same color are electrically connected to each other, among signal lines 50 connected to floating diffusions 49 of the pixels 9 constituting the pixel unit 10, and pixel signals of the pixels 9 of the same color are added and output to a CDS circuit 51. Thereby, it is possible to obtain a result of the addition of the pixel values of the pixels 9 of the same color.

Figure 24:
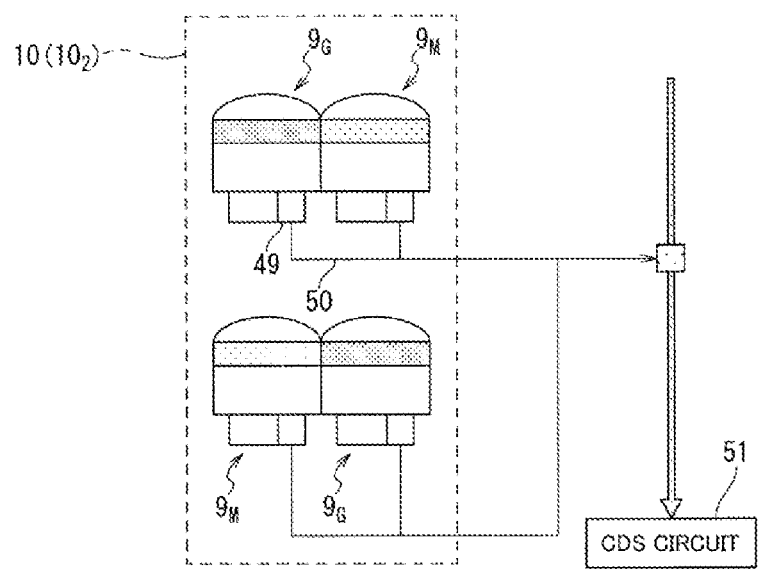
FIG. 24 is a diagram illustrating a connection state of a signal line.

In addition, as illustrated in FIG. 24, it is possible to adopt a configuration in which signal lines 50 connected to the floating diffusions 49 of the pixels 9 constituting the pixel unit 10 are electrically bonded to each other, and pixel signals of the plurality of pixels 9 are added and output to the CDS circuit 51. Thereby, it is possible to obtain luminance values (luminance information) of the image pixels 40 of the luminance image 41 illustrated in FIG. 16.

3. Example of Application to Moving Body

The technology according to the present disclosure (the present technology) can be applied to various products. For example, the technique according to the present disclosure may be realized as a device mounted on any type of moving body such as an automobile, an electric vehicle, a hybrid electric vehicle, a motorcycle, a bicycle, a personal mobility, an airplane, a drone, a ship, and a robot.

Figure 25:
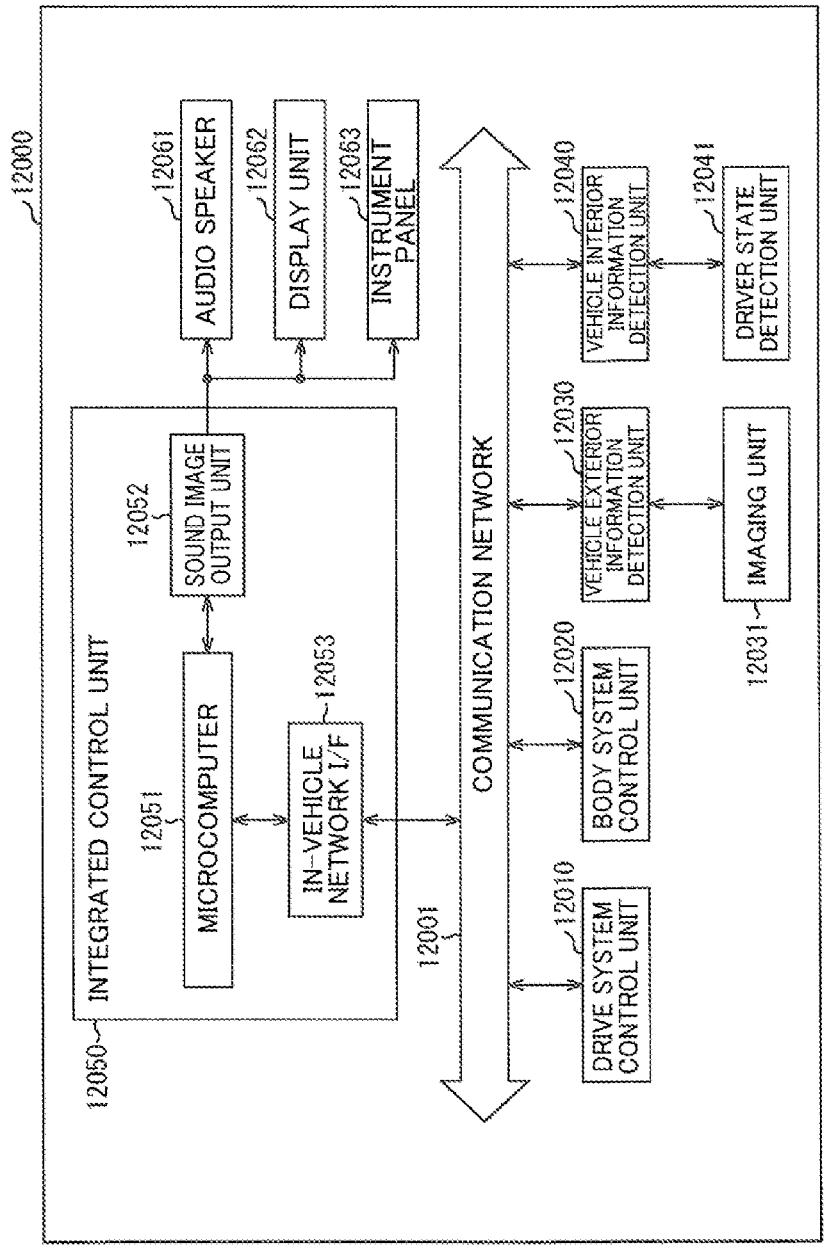
FIG. 25 is a block diagram illustrating an example of a schematic configuration of a vehicle control system.

FIG. 25 is a block diagram illustrating an example of a schematic configuration of a vehicle control system which is an example of a moving body control system to which the technology of the present disclosure can be applied.

A vehicle control system 12000 includes a plurality of electronic control units connected to each other via a communication network 12001. In the example illustrated in FIG. 25, the vehicle control system 12000 includes a drive system control unit 12010, a body system control unit 12020, a vehicle exterior information detection unit 12030, a vehicle interior information detection unit 12040, and an integrated control unit 12050. In addition, as functional configurations of the integrated control unit 12050, a microcomputer 12051, a sound image output unit 12052, and an in-vehicle network interface (I/F) 12053 are shown.

The drive system control unit 12010 controls operations of devices related to the drive system of the vehicle in accordance with various programs. For example, the drive system control unit 12010 functions as a driving force generation device for generating a driving force of a vehicle such as an internal combustion engine or a drive motor, a driving force transmission mechanism for transmitting a driving force to wheels, a steering mechanism for adjusting a steering angle of a vehicle, and a control device such as a braking device that generates a braking force of a vehicle.

The body system control unit 12020 controls operations of various devices equipped in a vehicle body in accordance with various programs. For example, the body system control unit 12020 functions as a control device of a keyless entry system, a smart key system, a power window device, or various lamps such as a head lamp, a back lamp, a brake lamp, and a turn signal or fog lamp. In this case, radio waves transmitted from a portable device that substitutes for a key or signals of various switches may be input to the body system control unit 12020. The body system control unit 12020 receives inputs of these radio waves or signals and controls a door lock device, a power window device, a lamp, and the like of a vehicle.

The vehicle exterior information detection unit 12030 detects information outside the vehicle in which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for peoples, cars, obstacles, signs, and letters on the road based on the received image.

The imaging unit 12031 is an optical sensor that receives light and outputs an electrical signal according to the amount of received light. The imaging unit 12031 can also output the electrical signal as an image and ranging information. In addition, the light received by the imaging unit 12031 may be visible light or invisible light such as infrared rays.

The vehicle interior information detection unit 12040 detects information inside the vehicle. For example, a driver state detection unit 12041 that detects a state of a driver is connected to the vehicle interior information detection unit 12040. The driver state detection unit 12041 includes, for example, a camera that captures an image of the driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generation device, the steering mechanism, or the braking device on the basis of information inside and outside the vehicle acquired by the vehicle exterior information detection unit 12030 or the vehicle interior information detection unit 12040, and output a control command to the drive system control unit 12010. For example, the microcomputer 12051 can perform cooperative control for the purpose of realizing functions of an advanced driver assistance system (ADAS) including vehicle collision avoidance, impact mitigation, following traveling based on an inter-vehicle distance, vehicle speed maintenance driving, vehicle collision warning, vehicle lane deviation warning, and the like.

Further, by controlling the driving force generation device, the steering mechanism, the braking device, and the like on the basis of information regarding the vicinity of the vehicle acquired by the vehicle exterior information detection unit 12030 or the vehicle interior information detection unit 12040, the microcomputer 12051 can perform cooperative control for the purpose of automated driving or the like in which autonomous travel is performed without depending on an operation of the driver.

In addition, the microcomputer 12051 can output a control command to the body system control unit 12020 based on the information outside the vehicle acquired by the vehicle exterior information detection unit 12030. For example, the microcomputer 12051 can perform coordinated control for antiglare such as switching a high beam to a low beam by controlling a headlamp according to a position of a preceding vehicle or an oncoming vehicle detected by the vehicle exterior information detection unit 12030.

The sound image output unit 12052 transmits an output signal of at least one of a sound and an image to an output device capable of visually or audibly notifying an occupant of a vehicle or the outside of the vehicle of information. In the example illustrated in FIG. 25, an audio speaker 12061, a display unit 12062, and an instrument panel 12063 are illustrated as output devices. The display unit 12062 may include, for example, at least one of an onboard display and a head-up display.

Figure 26:
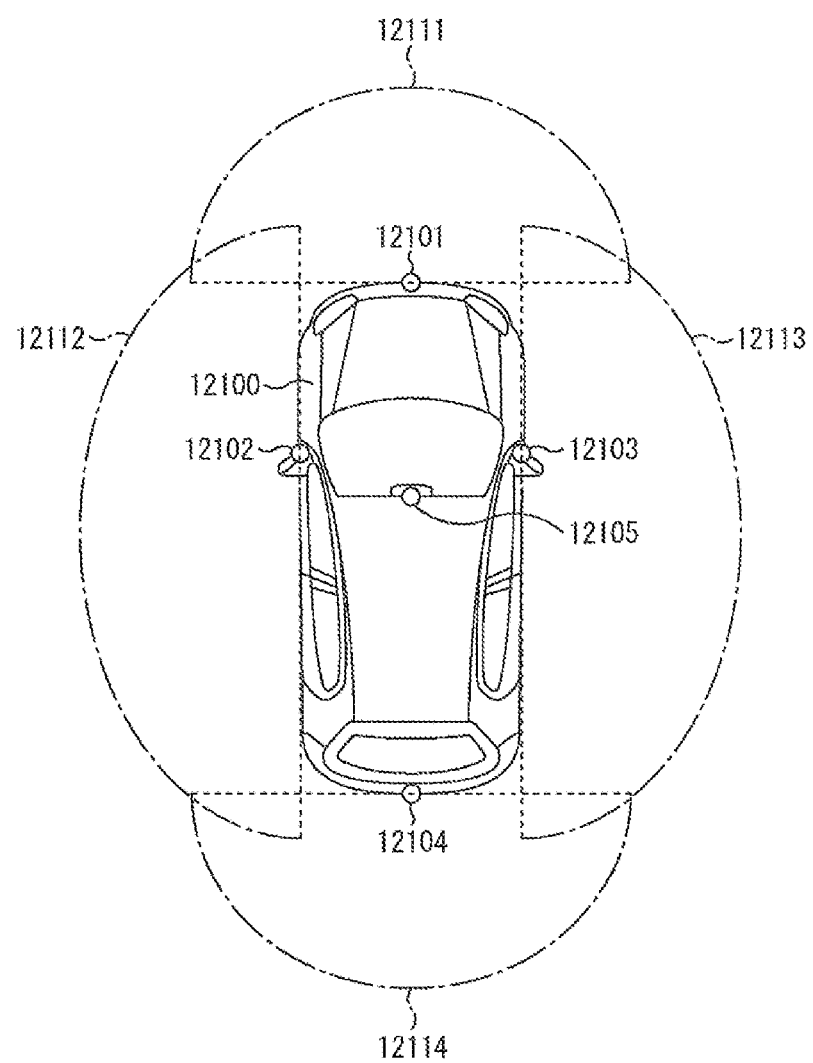
FIG. 26 is a diagram illustrating an example of installation positions of a vehicle exterior information detection unit and an imaging unit.

FIG. 26 is a diagram illustrating an example of positions at which the imaging unit 12031 is installed.

In FIG. 26, a vehicle 12100 includes imaging units 12101, 12102, 12103, 12104, and 12105 as the imaging unit 12031.

The imaging units 12101, 12102, 12103, 12104, and 12105 are provided at positions such as a front nose, side-view mirrors, a rear bumper, a back door, and an upper portion of a windshield in a vehicle interior of the vehicle 12100, for example. The imaging unit 12101 provided on the front nose and the imaging unit 12105 provided in the upper portion of the windshield in the vehicle interior mainly acquire images in front of the vehicle 12100. The imaging units 12102 and 12103 provided on the side mirrors mainly acquire images on a lateral side of the vehicle 12100. The imaging unit 12104 provided on the rear bumper or the back door mainly acquires images behind the vehicle 12100. Front view images acquired by the imaging units 12101 and 12105 are mainly used for detection of preceding vehicles, pedestrians, obstacles, traffic signals, traffic signs, lanes, and the like.

Note that, FIG. 26 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, and an imaging range 12114 indicates an imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function of acquiring distance information. For example, at least one of the imaging units 12101 to 12104 may be a stereo camera configured of a plurality of imaging elements or may be an imaging element having pixels for phase difference detection.

For example, the microcomputer 12051 can extract, particularly, a closest three-dimensional object on a path through which the vehicle 12100 is traveling, which is a three-dimensional object traveling at a predetermined speed (for example, 0 km/h or higher) in the substantially same direction as the vehicle 12100, as a preceding vehicle by acquiring a distance to each of three-dimensional objects in the imaging ranges 12111 to 12114 and temporal change in the distance (a relative speed with respect to the vehicle 12100) on the basis of distance information obtained from the imaging units 12101 to 12104. Further, the microcomputer 12051 can set an inter-vehicle distance which should be guaranteed in advance in front of a preceding vehicle and can perform automated brake control (also including following stop control) or automated acceleration control (also including following start control). In this manner, it is possible to perform cooperative control for the purpose of automated driving or the like in which autonomous travel is performed without depending on an operation of the driver.

For example, the microcomputer 12051 can classify and extract three-dimensional object data regarding three-dimensional objects into two-wheeled vehicles, ordinary vehicles, large vehicles, pedestrians, and other three-dimensional objects such as utility poles on the basis of the distance information obtained from the imaging units 12101 to 12104 and use the three-dimensional object data for automatic avoidance of obstacles. For example, the microcomputer 12051 identifies obstacles in the vicinity of the vehicle 12100 into obstacles that can be visually recognized by the driver of the vehicle 12100 and obstacles that are difficult to be visually recognized. In addition, the microcomputer 12051 can determine a collision risk indicating a degree of risk of collision with each obstacle, and when the collision risk has a value equal to or greater than a set value and there is a possibility of collision, outputs a warning to the driver via the audio speaker 12061 or the display unit 12062 and performs forced deceleration or avoidance steering via the drive system control unit 12010, so that it can perform driving assistance for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating the outline of the object and it is determined whether the object is a pedestrian. When the microcomputer 12051 determines that there is a pedestrian in the captured images of the imaging units 12101 to 12104, and the pedestrian is recognized, the sound image output unit 12052 controls the display unit 12062 so that the recognized pedestrian is superimposed and displayed with a square contour line for emphasis. In addition, the sound image output unit 12052 may control the display unit 12062 so that an icon indicating a pedestrian or the like is displayed at a desired position.

An example of the vehicle control system to which the technique according to the present disclosure may be applied has been described above. The technology of the present disclosure can be applied to the imaging unit 12031 and the like in the above-described configuration. Specifically, the solid-state imaging devices 101 and 1 in FIGS. 1 and 2 and the signal processing circuit 105 in FIG. 1 can be applied to the imaging unit 12031. By applying the technique according to the present disclosure to the imaging unit 12031, a clearer captured image can be obtained, and thus it is possible to reduce a driver's fatigue.

4. Example of Application to Endoscopic Operation System

The technology according to the present disclosure (the present technology) may be applied to, for example, an endoscopic operation system.

Figure 27:
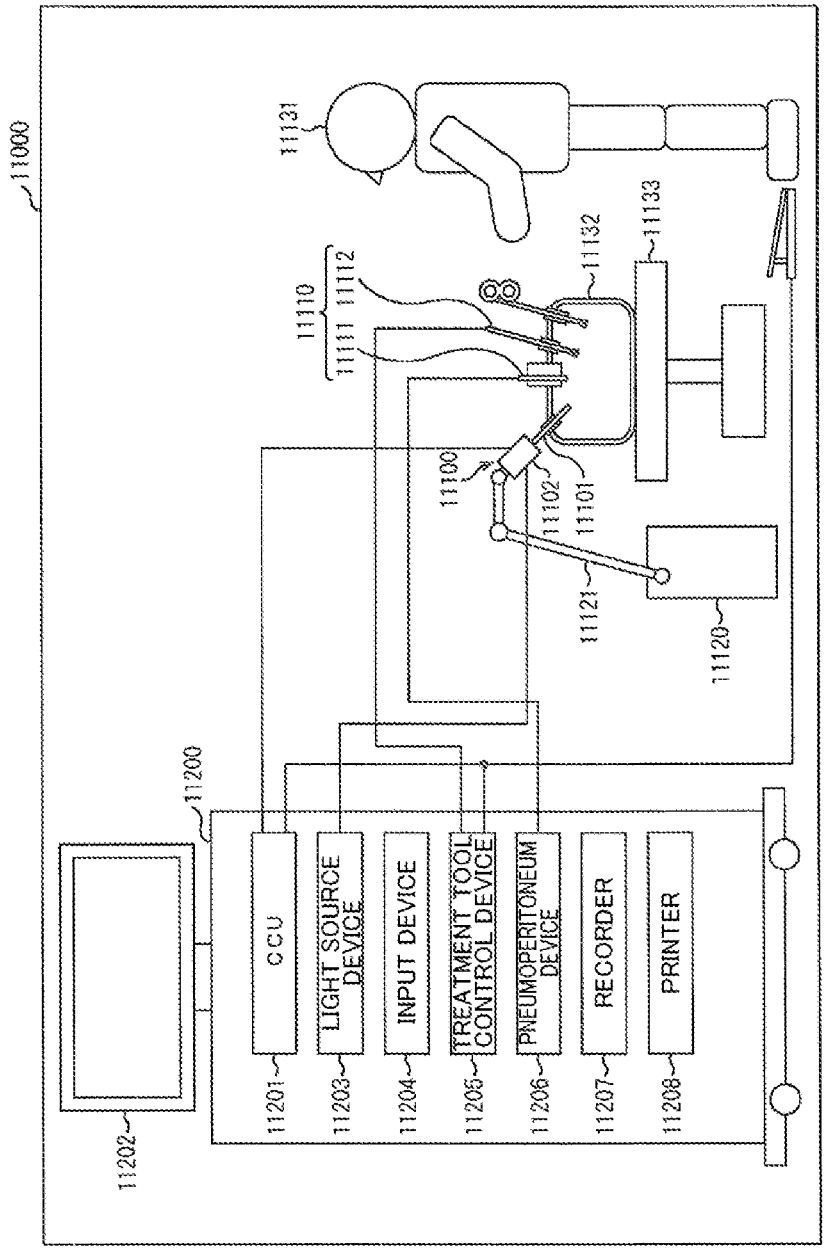
FIG. 27 is a diagram illustrating an example of a schematic configuration of an endoscopic operation system.

FIG. 27 is a diagram illustrating an example of a schematic configuration of an endoscopic operation system to which the technology according to the present disclosure (the present technology) can be applied.

FIG. 27 illustrates a state in which an operator (doctor) 11131 is performing operator on a patient 11132 on a patient bed 11133 using the endoscopic operation system 11000. As illustrated, the endoscopic operation system 11000 is configured of an endoscope 11100, other surgical instruments 11110 such as a pneumoperitoneum tube 11111 and an energized treatment tool 11112, a support arm device 11120 that supports the endoscope 11100, and a cart 11200 equipped with various devices for endoscopic operations.

The endoscope 11100 is configured of a lens barrel 11101, a region of which having a predetermined length from a tip is inserted into a body cavity of the patient 11132, and a camera head 11102 connected to a base end of the lens barrel 11101. Although the endoscope 11100 configured as a so-called rigid mirror having the rigid lens barrel 11101 is illustrated in the illustrated example, the endoscope 11100 may be configured as a so-called flexible mirror having a flexible lens barrel.

An opening portion into which an objective lens is fitted is provided at the tip of the lens barrel 11101. A light source device 11203 is connected to the endoscope 11100, and light generated by the light source device 11203 is guided to the tip of the lens barrel by a light guide provided to extend inside the lens barrel 11101 and is radiated toward an observation target in the body cavity of the patient 11132 via the objective lens. Note that the endoscope 11100 may be a forward-viewing endoscope, a perspective-viewing endoscope, or a side-viewing endoscope.

An optical system and an imaging element are provided inside the camera head 11102, and the reflected light (observation light) from the observation target converges on the imaging element by the optical system. The observation light is photoelectrically converted by the imaging element, and an electrical signal corresponding to the observation light, that is, an image signal corresponding to an observation image is generated. The image signal is transmitted to a camera control unit (CCU) 11201 as RAW data.

The CCU 11201 is configured of a central processing unit (CPU), a graphics processing unit (GPU) or the like, and comprehensively controls operations of the endoscope 11100 and a display device 11202. Further, the CCU 11201 receives the image signal from the camera head 11102 and performs various types of image processing for displaying an image based on the image signal, for example, development processing (demosaic processing) and the like, on the image signal.

The display device 11202 displays an image based on an image signal having been subjected to image processing by the CCU 11201 under the control of the CCU 11201.

The light source device 11203 is constituted by, for example, a light source such as a light emitting diode (LED), and supplies irradiation light at the time of imaging a surgical part or the like to the endoscope 11100.

An input device 11204 is an input interface for the endoscopic operation system 11000. The user can input various types of information or instructions to the endoscopic operation system 11000 via the input device 11204. For example, the user inputs an instruction to change imaging conditions (a type of irradiation light, a magnification, a focal length, or the like) of the endoscope 11100.

A treatment tool control device 11205 controls the driving of an energized treatment tool 11112 for cauterizing or incising tissue, sealing a blood vessel, or the like. In order to secure a field of view of the endoscope 11100 and secure an operation space of an operator, a pneumoperitoneum device 11206 sends gas into the body cavity of the patient 11132 via the pneumoperitoneum tube 11111 in order to inflate the body cavity. A recorder 11207 is a device that can record various types of information related to operator. A printer 11208 is a device that can print various types of information related to operator in various formats such as text, images and graphs.

The light source device 11203 that supplies the endoscope 11100 with the radiation light for imaging the surgical part can be configured of, for example, an LED, a laser light source, or a white light source configured of a combination thereof. When a white light source is formed by a combination of RGB laser light sources, it is possible to control an output intensity and an output timing of each color (each wavelength) with high accuracy and thus, the light source device 11203 adjusts white balance of the captured image. Further, in this case, laser light from each of the respective RGB laser light sources is radiated to the observation target in a time-division manner, and driving of the imaging element of the camera head 11102 is controlled in synchronization with a radiation timing, so that it is also possible to capture images corresponding to each of RGB in a time-division manner. According to this method, it is possible to obtain a color image without providing a color filter to the imaging element.

Further, the driving of the light source device 11203 may be controlled to change the intensity of output light at predetermined time intervals. The driving of the imaging element of the camera head 11102 is controlled in synchronization with the timing of the change in the light intensity to acquire an image in a time-division manner, and the image is synthesized, whereby it is possible to generate a so-called image in a high dynamic range without underexposure or overexposure.

In addition, the light source device 11203 may have a configuration in which light in a predetermined wavelength band corresponding to special light observation can be supplied. In the special light observation, for example, by emitting light in a band narrower than that of irradiation light (that is, white light) during normal observation using wavelength dependence of light absorption in a body tissue, so-called narrow band light observation (narrow band imaging) in which a predetermined tissue such as a blood vessel in the mucous membrane surface layer is imaged with a high contrast is performed. Alternatively, in the special light observation, fluorescence observation in which an image is obtained by fluorescence generated by emitting excitation light may be performed. The fluorescence observation can be performed by emitting excitation light to a body tissue and observing fluorescence from the body tissue (autofluorescence observation), or locally injecting a reagent such as indocyanine green (ICG) to a body tissue and emitting excitation light corresponding to a fluorescence wavelength of the reagent to the body tissue to obtain a fluorescence image. The light source device 11203 may be configured to be able to supply narrow band light and/or excitation light corresponding to such special light observation.

Figure 28:
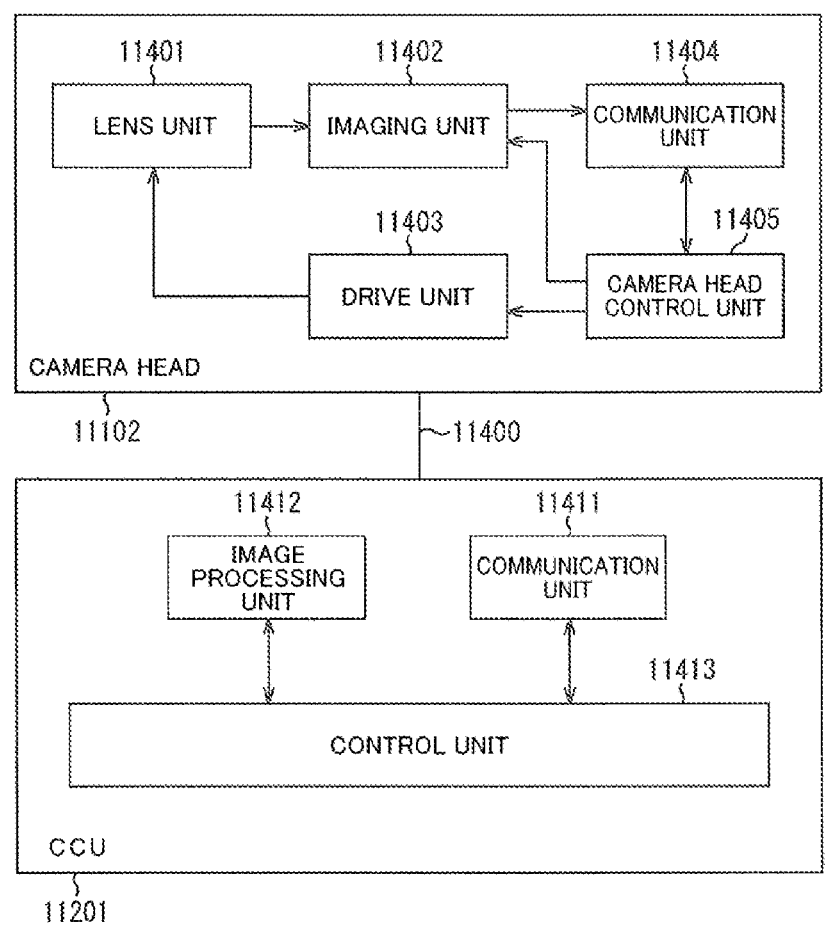
FIG. 28 is a block diagram illustrating an example of functional configurations of a camera head and a CCU.

FIG. 28 is a block diagram illustrating an example of a functional configuration of the camera head 11102 and CCU 11201 illustrated in FIG. 27.

The camera head 11102 has a lens unit 11401, an imaging unit 11402, a drive unit 11403, a communication unit 11404, and a camera head control unit 11405. The CCU 11201 has a communication unit 11411, an image processing unit 11412, and a control unit 11413. The camera head 11102 and the CCU 11201 are connected to each other via a transmission cable 11400 so that they can communicate with each other.

The lens unit 11401 is an optical system provided at a portion for connection to the lens barrel 11101. The observation light taken in from the tip of the lens barrel 11101 is guided to the camera head 11102 and incident on the lens unit 11401. The lens unit 11401 is configured of a combination of a plurality of lenses including a zoom lens and a focus lens.

The imaging unit 11402 is constituted by an imaging element. The imaging element constituting the imaging unit 11402 may be one element (so-called single plate type) or a plurality of elements (so-called multi-plate type). When the imaging unit 11402 is configured as a multi-plate type, for example, image signals corresponding to RGB are generated by the imaging elements, and a color image may be obtained by synthesizing the image signals. Alternatively, the imaging unit 11402 may be configured to include a pair of imaging elements for acquiring image signals for the right eye and the left eye corresponding to three-dimensional (3D) display. When 3D display is performed, the operator 11131 can ascertain the depth of biological tissues in the surgical part more accurately. Here, when the imaging unit 11402 is configured as a multi-plate type, a plurality of lens units 11401 may be provided according to the imaging elements.

Further, the imaging unit 11402 may not necessarily be provided in the camera head 11102. For example, the imaging unit 11402 may be provided immediately after the objective lens inside the lens barrel 11101.

The drive unit 11403 is constituted by an actuator, and moves the zoom lens and the focus lens of the lens unit 11401 by a predetermined distance along an optical axis under the control of the camera head control unit 11405. Thereby, the magnification and the focus of the image captured by the imaging unit 11402 can be appropriately adjusted.

The communication unit 11404 is configured of a communication device for transmitting or receiving various information to or from the CCU 11201. The communication unit 11404 transmits the image signal obtained from the imaging unit 11402 as RAW data to the CCU 11201 via the transmission cable 11400.

Further, the communication unit 11404 receives a control signal for controlling the driving of the camera head 11102 from the CCU 11201 and supplies the control signal to the camera head control unit 11405. The control signal includes, for example, information on imaging conditions such as information for designating a frame rate of a captured image, information for designating an exposure value at the time of imaging, and/or information for designating a magnification and a focus of the captured image.

Also, the imaging conditions such as the frame rate, the exposure value, the magnification, and the focus described above may be appropriately designated by the user or may be automatically set by the control unit 11413 of the CCU 11201 on the basis of the acquired image signal. In the latter case, a so-called auto exposure (AE) function, auto focus (AF) function and auto white balance (AWB) function are provided in the endoscope 11100.

The camera head control unit 11405 controls the driving of the camera head 11102 on the basis of the control signal from the CCU 11201 received via the communication unit 11404.

The communication unit 11411 is configured of a communication device for transmitting and receiving various types of information to and from the camera head 11102. The communication unit 11411 receives an image signal transmitted from the camera head 11102 via the transmission cable 11400.

In addition, the communication unit 11411 transmits a control signal for controlling the driving of the camera head 11102 to the camera head 11102. The image signal or the control signal can be transmitted through electric communication, optical communication, or the like.

The image processing unit 11412 performs various image processing on the image signal which is the RAW data transmitted from the camera head 11102.

The control unit 11413 performs various kinds of control regarding imaging of the surgical part or the like using the endoscope 11100 and display of a captured image obtained by imaging the surgical part or the like. For example, the control unit 11413 generates the control signal for controlling the driving of the camera head 11102.

Further, the control unit 11413 causes the display device 11202 to display the captured image obtained by imaging the surgical part or the like on the basis of the image signal that has been subjected to the image processing by the image processing unit 11412. In this case, the control unit 11413 may recognize various objects in the captured image using various image recognition techniques. For example, the control unit 11413 can recognize surgical tools such as forceps, specific biological parts, bleeding, mist when the energized treatment tool 11112 is used, and the like by detecting an edge shape, a color, and the like of an object included in the captured image. When the control unit 11413 causes the display device 11202 to display the captured image, it may cause various types of surgical support information to be superimposed and displayed with the image of the surgical part using the recognition result. When the surgical support information is superimposed and displayed, and presented to the operator 11131, it is possible to reduce the burden on the operator 11131 and the operator 11131 can reliably proceed the operation.

The transmission cable 11400 connecting the camera head 11102 and the CCU 11201 to each other is an electric signal cable that supports electric signal communication, an optical fiber that supports optical communication, or a composite cable thereof.

Here, in the example shown in the drawing, communication is performed in a wired manner using the transmission cable 11400, but communication between the camera head 11102 and the CCU 11201 may be performed in a wireless manner.

An example of the endoscopic operation system to which the technique according to the present disclosure can be applied has been described above. The technique according to the present disclosure may be applied to, for example, the imaging unit 11402 of the camera head 11102, the image processing unit 11412 of the CCU 11201, and the like among the configurations described above. Specifically, the solid-state imaging devices 101 and 1 in FIGS. 1 and 2 can be applied to the imaging unit 10402, and the signal processing circuit 105 in FIG. 1 can be applied to the image processing unit 11412. By applying the technology according to the present disclosure to the imaging unit 10402 and the image processing unit 11412, it is possible to obtain a clearer image of the surgical part and thus, the surgeon can reliably confirm the surgical part.

Here, although the endoscopic operation system has been described as an example, the technology according to the present disclosure may be applied to other, for example, a microscopic operation system.

The present technology can also take on the following configurations.

(1) A solid-state imaging device including:
  a pixel array portion in which a plurality of pixel unit groups are arrayed, the pixel unit group being constituted by pixel units disposed in a 2×2 matrix, the pixel unit being constituted by pixels disposed in an m×m (m is a natural number of 2 or greater) matrix, and the pixel including a photoelectric conversion unit and a color filter formed to correspond to the photoelectric conversion unit,
  wherein each of the pixel unit groups includes an R filter transmitting red light and a C filter transmitting cyan light having a complementary color relation with the red light as the color filters in a first pixel unit among four pixel units constituting the pixel unit group, includes a G filter transmitting green light and an M filter transmitting magenta light having a complementary color relation with the green light as the color filters in each of second and third pixel units, and includes a B filter transmitting blue light and a Y filter transmitting yellow light having a complementary color relation with the blue light as the color filters in a fourth pixel unit.

(2) The solid-state imaging device according to (1),
  wherein m is a natural number of 3 or greater,
  the first pixel unit is configured such that some of the pixels mutually positioned in a checkered pattern among the plurality of pixels disposed in an m×m matrix include the R filter, and the remaining pixels include the C filter, the second pixel unit is configured such that some of the pixels mutually positioned in a checkered pattern among the plurality of pixels disposed in an m×m matrix include the G filter, and the remaining pixels include the M filter, and the third pixel unit is configured such that some of the pixels mutually positioned in a checkered pattern among the plurality of pixels disposed in an m×m matrix include the B filter, and the remaining pixels include the Y filter.

(3) The solid-state imaging device according to (1), wherein m=2, the first pixel unit is configured such that one pixel pair out of pixel pairs disposed at diagonal positions includes the R filters, and the other pixel pair includes the C filters, the second pixel unit is configured such that one pixel pair out of pixel pairs disposed at diagonal positions includes the G filters, and the other pixel pair includes the M filters, and the third pixel unit is configured such that one pixel pair out of pixel pairs disposed at diagonal positions includes the B filters, and the other pixel pair includes the M filters.

(4) Electronic equipment including:

a solid-state imaging device that includes a pixel array portion in which a plurality of pixel unit groups are arrayed, the pixel unit group being constituted by pixel units disposed in a 2×2 matrix, the pixel unit being constituted by pixels disposed in an m×m (m is a natural number of 2 or greater) matrix, and the pixel including a photoelectric conversion unit and a color filter formed to correspond to the photoelectric conversion unit, in which each of the pixel unit groups includes an R filter transmitting red light and a C filter transmitting cyan light having a complementary color relation with the red light as the color filters in a first pixel unit among four pixel units constituting the pixel unit group, includes a G filter transmitting green light and an M filter transmitting magenta light having a complementary color relation with the green light as the color filters in each of second and third pixel units, and includes a B filter transmitting blue light and a Y filter transmitting yellow light having a complementary color relation with the blue light as the color filters in a fourth pixel unit;

an optical lens that forms image light from a subject into an image on an imaging surface of the solid-state imaging device; and a signal processing circuit that performs signal processing on a signal output from the solid-state imaging device.

(5) The electronic equipment according to (4), wherein the signal processing circuit includes a binning processing unit that generates an RGB mosaic image by adding pixel values of image pixels included in each of pixel groups corresponding to the first pixel unit in a mosaic image corresponding to an array of the color filters obtained from the signal to set the pixel values as a pixel value of one image pixel having only color information of the color red, adding pixel values of image pixels having only color information of the color green in each of pixel groups corresponding to the second and third pixel units to set the pixel values as a pixel value of one image pixel having only color information of the color green, and adding pixel values of image pixels having only color information of the color blue in each of pixel groups corresponding to the fourth pixel unit to set the pixel values as a pixel value of one image pixel having only color information of the color blue.

(6) The electronic equipment according to (4) or (5), wherein the signal processing circuit includes a binning processing unit that generates a CMY mosaic image by adding pixel values of image pixels having only color information of the color cyan in each of pixel groups corresponding to the first pixel unit in a mosaic image corresponding to an array of the color filters obtained from the signal to set the pixel values as a pixel value of one image pixel having only color information of the color cyan, adding pixel values of image pixels having only color information of the color magenta in each of pixel groups corresponding to the second and third pixel units to set the pixel values as a pixel value of one image pixel having only color information of the color magenta, and adding pixel values of image pixels having only color information of the color yellow in each of pixel groups corresponding to the fourth pixel unit to set the pixel values as a pixel value of one image pixel having only color information of the color yellow.

(7) The electronic equipment according to any one of (4) to (6), wherein the signal processing circuit includes a binning processing unit that adds pixel values of image pixels having color information of red and cyan colors in each of pixel groups corresponding to the first pixel unit in a mosaic image corresponding to an array of the color filters obtained from the signal to calculate a luminance value of one image pixel, adds pixel values of image pixels having color information of green and magenta colors in each of pixel groups corresponding to the second and third pixel units to calculate a luminance value of one image pixel, and adds pixel values of image pixels having color information of blue and yellow colors in each of pixel groups corresponding to the fourth pixel unit to calculate a luminance value of one image pixel.

(8) The electronic equipment according to (7), wherein the luminance value calculation unit uses a numerical value obtained by multiplying the pixel value of the mosaic image by a correction coefficient which is set for each color temperature of a light source, as a pixel value to be used to calculate the luminance value.

(9) The electronic equipment according to (7) or (8), wherein the signal processing circuit includes a binning processing unit that generates an RGB mosaic image by adding pixel values of image pixels having only color information of the color red in each of pixel groups corresponding to the first pixel unit in a mosaic image corresponding to an array of the color filters obtained from the signal to set the pixel values as a pixel value of one image pixel having only color information of the color red, adding pixel values of image pixels having only color information of the color green in each of pixel groups corresponding to the second and third pixel units to set the pixel values as a pixel value of one image pixel having only color information of the color green, and adding pixel values of image pixels having only color information of the color blue in each of pixel groups corresponding to the fourth pixel unit to set the pixel values as a pixel value of one image pixel having only color information of the color blue, and a luminance synthesis unit that synthesizes the RGB mosaic image and the luminance value.

(10) The electronic equipment according to (7) or (8), wherein the signal processing circuit includes a binning processing unit that generates a CMY mosaic image by adding pixel values of image pixels having only color information of the color cyan in each of pixel groups corresponding to the first pixel unit in a mosaic image corresponding to an array of the color filters obtained from the signal to set the pixel values as a pixel value of one image pixel having only color information of the color cyan, adding pixel values of image pixels having only color information of the color magenta in each of pixel groups corresponding to the second and third pixel units to set the pixel values as a pixel value of one image pixel having only color information of the color magenta, and adding pixel values of image pixels having only color information of the color yellow in each of pixel groups corresponding to the fourth pixel unit to set the pixel values as a pixel value of one image pixel having only color information of the color yellow, and a luminance synthesis unit that converts the CMY mosaic image into an RGB mosaic image and then synthesizes the converted RGB mosaic image and the luminance value.

(11) The electronic equipment according to (5), wherein the binning processing unit generates the RGB mosaic image and generates a CMY mosaic image by adding pixel values of image pixels having only color information of the color cyan in each of pixel groups corresponding to the first pixel unit in a mosaic image corresponding to an array of the color filters obtained from the signal to set the pixel values as a pixel value of one image pixel having only color information of the color cyan, adding pixel values of image pixels having only color information of the color magenta in each of pixel groups corresponding to the second and third pixel units to set the pixel values as a pixel value of one image pixel having only color information of the color magenta, and adding pixel values of image pixels having only color information of the color yellow in each of pixel groups corresponding to the fourth pixel unit to set the pixel values as a pixel value of one image pixel having only color information of the color yellow, and the signal processing circuit includes an HDR image generation unit that converts the CMY mosaic image into an RGB mosaic image and synthesizes the converted RGB mosaic image and the RGB mosaic image generated by the binning processing unit to generate a high dynamic range image.

REFERENCE SIGNS LIST

1 Solid-state imaging device
2 Substrate
3 Pixel array portion
4 Vertical drive circuit
5 Column signal processing circuit
6 Horizontal drive circuit
7 Output circuit
8 Control circuit
9 Pixel
10 Pixel unit
11 Pixel unit group
12 Pixel drive wiring
13 Vertical signal line
14 Horizontal signal line
15 Insulating film
16 Light shielding film
17 Flattening film
18 Light receiving layer
19 Color filter
20 Microlens
21 Light condensing layer
22 Wiring layer
23 Support substrate
24 Photoelectric conversion unit
25 Pixel separation unit
26 Color filter array
27 Microlens array
28 Interlayer insulating film
29 Wiring
30 Mosaic image
31 Image pixel
32 Image pixel
33 RGB mosaic image
34 Image pixel
35 CMY mosaic image
$36_1$, $36_2$, $36_3$, $36_4$ Pixel group
37 Image pixel
38 Image pixel
39 CMY mosaic image
40 Image pixel
41 Luminance image
42 Synthesis image
43 Image pixel
44 RGB mosaic image
45 Synthesis image
46 RGB mosaic image
47 HDR image
48 Image pixel
100 Electronic equipment
101 Solid-state imaging device
102 Optical lens
103 Shutter device
104 Drive circuit
105 Signal processing circuit
106 Mosaic image generation unit
107 White balance adjustment unit
108 Mode determination unit
109 Remosaic processing unit
110 Binning processing unit
111 Luminance value calculation unit
112 Luminance synthesis unit
113 Incident light
114 HDR image generation unit

What is claimed is:

1. A solid-state imaging device, comprising:
a pixel array portion in which a plurality of pixel unit groups are arrayed, each of the pixel unit groups being constituted by four pixel units disposed in a 2×2 matrix, the pixel units being constituted by pixels disposed in an m×m (m is a natural number of 3 or greater) matrix, and the pixels including a photoelectric conversion unit and a color filter formed to correspond to the photoelectric conversion unit,
wherein each of the pixel unit groups includes an R filter transmitting red light and a C filter transmitting cyan light having a complementary color relation with the red light as the color filters in a first pixel unit among four pixel units constituting the pixel unit group, wherein each of the pixel unit groups includes a G filter transmitting green light and an M filter transmitting magenta light having a complementary color relation with the green light as the color filters in each of second and third pixel units, and wherein each of the pixel unit groups includes a B filter transmitting blue light and a Y filter transmitting yellow light having a complementary color relation with the blue light as the color filters in a fourth pixel unit, wherein the first pixel unit of each of the pixel unit groups is configured such that some of the pixels mutually positioned in a checkered pattern among the plurality of pixels disposed in an mm matrix include a R filter, and the remaining pixels include a C filter, wherein the second pixel unit of each of the pixel unit groups is configured such that some of the pixels mutually positioned in a checkered pattern among the plurality of pixels disposed in an mm matrix include the G filter, and the remaining pixels include the M filter, and wherein the fourth pixel unit is configured such that some of the pixels mutually positioned in a checkered pattern among the plurality of pixels disposed in an mm matrix include the B filter, and the remaining pixels include the Y filter.

2. A solid-state imaging device, comprising:

a pixel array portion in which a plurality of pixel unit groups are arrayed, each of the pixel unit groups being constituted by four pixel units disposed in a 2×2 matrix, the pixel units being constituted by pixels disposed in an m×m (m is a natural number of 2 or greater) matrix, and the pixels including a photoelectric conversion unit and a color filter formed to correspond to the photoelectric conversion unit, wherein each of the pixel unit groups includes an R filter transmitting red light and a C filter transmitting cyan light having a complementary color relation with the red light as the color filters in a first pixel unit among four pixel units constituting the pixel unit group, wherein each of the pixel unit groups includes a G filter transmitting green light and an M filter transmitting magenta light having a complementary color relation with the green light as the color filters in each of second and third pixel units, wherein each of the pixel unit groups includes a B filter transmitting blue light and a Y filter transmitting yellow light having a complementary color relation with the blue light as the color filters in a fourth pixel unit, wherein the first pixel unit of each unit pixel group includes two R filters disposed along a first diagonal and two C filters disposed along a second diagonal that is perpendicular to the first diagonal, wherein the second pixel unit of each unit pixel group includes two G filters disposed along a third diagonal and two M filters disposed along a fourth diagonal that is perpendicular to the third diagonal, and wherein the fourth pixel unit of each unit pixel group includes two B filters disposed along a fifth diagonal, and Y filters disposed along a sixth diagonal.

3. The solid-state imaging device according to claim 2, wherein the second diagonal is coincident with the sixth diagonal.

4. Electronic equipment, comprising:

a solid-state imaging device that includes a pixel array portion in which a plurality of pixel unit groups are arrayed, the pixel unit group being constituted by pixel units disposed in a 2×2 matrix, the pixel unit being constituted by pixels disposed in an m×m (m is a natural number of 2 or greater) matrix, and the pixel including a photoelectric conversion unit and a color filter formed to correspond to the photoelectric conversion unit, in which each of the pixel unit groups includes an R filter transmitting red light and a C filter transmitting cyan light having a complementary color relation with the red light as the color filters in a first pixel unit among four pixel units constituting the pixel unit group, includes a G filter transmitting green light and an M filter transmitting magenta light having a complementary color relation with the green light as the color filters in each of second and third pixel units, and includes a B filter transmitting blue light and a Y filter transmitting yellow light having a complementary color relation with the blue light as the color filters in a fourth pixel unit;

an optical lens that forms image light from a subject into an image on an imaging surface of the solid-state imaging device; and a signal processing circuit that performs signal processing on a signal output from the solid-state imaging device, wherein the signal processing circuit includes a luminance value calculation unit that adds pixel values of image pixels having color information of the colors red and cyan in each of pixel groups corresponding to the first pixel unit in a mosaic image corresponding to an array of the color filters obtained from the signal to calculate a luminance value of one image pixel, adds pixel values of image pixels having color information of the color green and magenta in each of pixel groups corresponding to the second and third pixel units to calculate a luminance value of one image pixel, and adds pixel values of image pixels having color information of the colors blue and yellow in each of pixel groups corresponding to the fourth pixel unit to calculate a luminance value of one image pixel, wherein the signal processing circuit includes a binning processing unit that generates an RGB mosaic image by adding pixel values of image pixels having only color information of the color red in each of pixel groups corresponding to the first pixel unit in a mosaic image corresponding to an array of the color filters obtained from the signal to set the pixel values as a pixel value of one image pixel having only color information of the color red, adding pixel values of image pixels having only color information of the color green in each of pixel groups corresponding to the second and third pixel units to set the pixel values as a pixel value of one image pixel having only color information of the color green, and adding pixel values of image pixels having only color information of the color blue in each of pixel groups corresponding to the fourth pixel unit to set the pixel values as a pixel value of one image pixel having only color information of the color blue, wherein the binning processing unit generates the RGB mosaic image and generates a CMY mosaic image by adding pixel values of image pixels having only color information of the color cyan in each of pixel groups corresponding to the first pixel unit in a mosaic image corresponding to an array of the color filters obtained from the signal to set the pixel values as a pixel value of one image pixel having only color information of the color cyan, adding pixel values of image pixels having only color information of the color magenta in each of pixel groups corresponding to the second and third pixel units to set the pixel values as a pixel value of one image pixel having only color information of the color magenta, and adding pixel values of image pixels having only color information of the color yellow in each of pixel groups corresponding to the fourth pixel unit to set the pixel values as a pixel value of one image pixel having only color information of the color yellow, and wherein the signal processing circuit includes an HDR image generation unit that converts the CMY mosaic image into an RGB mosaic image and synthesizes the converted RGB mosaic image and the RGB mosaic image generated by the binning processing unit to generate a high dynamic range image.

5. Electronic equipment, comprising:

a solid-state imaging device that includes a pixel array portion in which a plurality of pixel unit groups are arrayed, the pixel unit group being constituted by pixel units disposed in a 2×2 matrix, the pixel unit being constituted by pixels disposed in an m×m (m is a natural number of 2 or greater) matrix, and the pixel including a photoelectric conversion unit and a color filter formed to correspond to the photoelectric conversion unit, in which each of the pixel unit groups includes an R filter transmitting red light and a C filter transmitting cyan light having a complementary color relation with the red light as the color filters in a first pixel unit among four pixel units constituting the pixel unit group, includes a G filter transmitting green light and an M filter transmitting magenta light having a complementary color relation with the green light as the color filters in each of second and third pixel units, and includes a B filter transmitting blue light and a Y filter transmitting yellow light having a complementary color relation with the blue light as the color filters in a fourth pixel unit;

an optical lens that forms image light from a subject into an image on an imaging surface of the solid-state imaging device; and a signal processing circuit that performs signal processing on a signal output from the solid-state imaging device, wherein the signal processing circuit includes:

a luminance value calculation unit that adds pixel values of image pixels having color information of the colors red and cyan in each of pixel groups corresponding to the first pixel unit in a mosaic image corresponding to an array of the color filters obtained from the signal to calculate a luminance value of one image pixel, adds pixel values of image pixels having color information of the color green and magenta in each of pixel groups corresponding to the second and third pixel units to calculate a luminance value of one image pixel, and adds pixel values of image pixels having color information of the colors blue and yellow in each of pixel groups corresponding to the fourth pixel unit to calculate a luminance value of one image pixel, and wherein the signal processing circuit further includes one of:

1) A binning processing unit that generates an RGB mosaic image by adding pixel values of image pixels having only color information of the color red in each of pixel groups corresponding to the first pixel unit in a mosaic image corresponding to an array of the color filters obtained from the signal to set the pixel values as a pixel value of one image pixel having only color information of the color red, adding pixel values of image pixels having only color information of the color green in each of pixel groups corresponding to the second and third pixel units to set the pixel values as a pixel value of one image pixel having only color information of the color green, and adding pixel values of image pixels having only color information of the color blue in each of pixel groups corresponding to the fourth pixel unit to set the pixel values as a pixel value of one image pixel having only color information of the color blue, and a luminance synthesis unit that synthesizes the RGB mosaic image and the luminance value; or 2) a binning processing unit that generates a CMY mosaic image by adding pixel values of image pixels having only color information of the color cyan in each of pixel groups corresponding to the first pixel unit in a mosaic image corresponding to an array of the color filters obtained from the signal to set the pixel values as a pixel value of one image pixel having only color information of the color cyan, adding pixel values of image pixels having only color information of the color magenta in each of pixel groups corresponding to the second and third pixel units to set the pixel values as a pixel value of one image pixel having only color information of the color magenta, and adding pixel values of image pixels having only color information of the color yellow in each of pixel groups corresponding to the fourth pixel unit to set the pixel values as a pixel value of one image pixel having only color information of the color yellow, and a luminance synthesis unit that converts the CMY mosaic image into an RGB mosaic image and then synthesizes the converted RGB mosaic image and the luminance value.

* * * * *